(12) United States Patent
Kvalnes et al.

(10) Patent No.: US 11,354,348 B2
(45) Date of Patent: Jun. 7, 2022

(54) OPTIMIZED RECORD PLACEMENT IN GRAPH DATABASE

(71) Applicant: Microsoft Technology Licensing, LLC, Redmond, WA (US)

(72) Inventors: Åge Kvalnes, Tromsø (NO); Jan-Ove Karlberg, Tromsø (NO); Tor Kreutzer, Tromsø (NO); Amund Kronen Johansen, Tromsø (NO); Steffen Viken Valvåg, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 233 days.

(21) Appl. No.: 15/636,742

(22) Filed: Jun. 29, 2017

(65) Prior Publication Data

US 2019/0005071 A1    Jan. 3, 2019

(51) Int. Cl.
*G06F 16/532*     (2019.01)
*G06F 12/06*      (2006.01)
(Continued)

(52) U.S. Cl.
CPC ........ *G06F 16/532* (2019.01); *G06F 12/0653* (2013.01); *G06F 16/2455* (2019.01); *G06F 16/7854* (2019.01); *G06F 40/205* (2020.01); *G06F 3/061* (2013.01); *G06F 3/0601* (2013.01); *G06F 3/064* (2013.01); *G06F 3/0608* (2013.01); *G06F 16/1724* (2019.01); *G06F 16/1727* (2019.01); *G06F 16/9024* (2019.01); *G06F 2206/1004* (2013.01)

(58) Field of Classification Search
CPC ...... G06F 16/21; G06F 16/211; G06F 16/532; G06F 40/205; G06F 16/2455; G06F 16/7854; G06F 12/0653; G06F 3/061; G06F 3/064; G06F 3/0608; G06F 3/0601; G06F 16/1724; G06F 16/1727; G06F 16/9024; G06F 2206/1004
USPC .......................................................... 707/798
See application file for complete search history.

(56) References Cited

U.S. PATENT DOCUMENTS 8,595,262 B1 * 11/2013 Hayden ............... G06F 16/2471
707/798
9,535,963 B1    1/2017 Shankar et al.
(Continued)

OTHER PUBLICATIONS

"GT.M Administration and Operations Guide", http://tinco.pair.com/bhaskar/gtm/doc/books/ao/UNIX_manual/ao_UNIX_screen.pdf, Published on: Mar. 20, 2017, 498 pages.
(Continued)

*Primary Examiner* — Tamara T Kyle
*Assistant Examiner* — Raheem Hoffler

(57) ABSTRACT

Methods and systems are disclosed for optimizing record placement in a graph by minimizing fragmentation when writing data. Issues with fragmented data within a graph database are addressed on the record level by placing data that is frequently accessed together contiguously within memory. For example, a dynamic rule set may be developed based on dynamically analyzing access patterns of the graph database, policies, system characteristics and/or other heuristics. Based on statistics regarding normal query patterns, the systems and methods may identify an optimal position for certain types of edges that are often traversed with respect to particular types of nodes.

20 Claims, 15 Drawing Sheets

(51) Int. Cl.
  *G06F 16/783* (2019.01)
  *G06F 16/2455* (2019.01)
  *G06F 40/205* (2020.01)
  *G06F 3/06* (2006.01)
  *G06F 16/901* (2019.01)
  *G06F 16/17* (2019.01)

(56) References Cited

U.S. PATENT DOCUMENTS

| | | | | |
|---|---|---|---|---|
| 9,665,393 | B1* | 5/2017 | Johnson | G06F 9/468 |
| 9,665,620 | B2* | 5/2017 | Schechter | G06F 16/24542 |
| 10,089,676 | B1* | 10/2018 | Gupta | G06Q 30/0633 |
| 10,496,678 | B1* | 12/2019 | Tang | G06F 16/282 |
| 10,607,074 | B2* | 3/2020 | Lacoste | G06N 5/022 |
| 2008/0263059 | A1* | 10/2008 | Coca | G06F 3/0613 |
| 2009/0157948 | A1* | 6/2009 | Trichina | G06F 12/0246 711/103 |
| 2009/0254594 | A1 | 10/2009 | Burchall | |
| 2014/0067867 | A1* | 3/2014 | Pattabhi | G06F 16/24542 707/792 |
| 2016/0057733 | A1* | 2/2016 | Grandillo | H04H 20/423 370/252 |
| 2016/0283366 | A1* | 9/2016 | Nguyen Tien | G06F 12/0246 |
| 2017/0017708 | A1* | 1/2017 | Fuchs | G06F 16/288 |
| 2017/0060958 | A1* | 3/2017 | Van Rest | G06F 16/9024 |
| 2017/0068748 | A1* | 3/2017 | Hu | G06F 16/9017 |
| 2017/0083571 | A1 | 3/2017 | Shankar et al. | |
| 2018/0121512 | A1* | 5/2018 | Cho | G06F 16/9024 |
| 2018/0218453 | A1* | 8/2018 | Crabtree | G06Q 30/0202 |
| 2018/0374575 | A1* | 12/2018 | Yamamoto | G06F 16/285 |

OTHER PUBLICATIONS

"Mupip Reorg", http://www.mumps.cz/gtm/books/ao/UNIX_manual/ch05s02s15.html, Retrieved on: May 24, 2017, 3 pages.

Snider, Matt, "Defragmentation of metrics and load in Service Fabric", https://docs.microsoft.com/en-us/azure/service-fabric/service-fabric-cluster-resource-manager-defragmentation-metrics, Published on: Jan. 5, 2017, 5 pages.

Weinberger, Claudius, "Index Free Adjacency or Hybrid Indexes for Graph Databases", https://www.arangodb.com/2016/04/index-free-adjacency-hybrid-indexes-graph-databases/, Published on: Apr. 18, 2016, 8 pages.

* cited by examiner

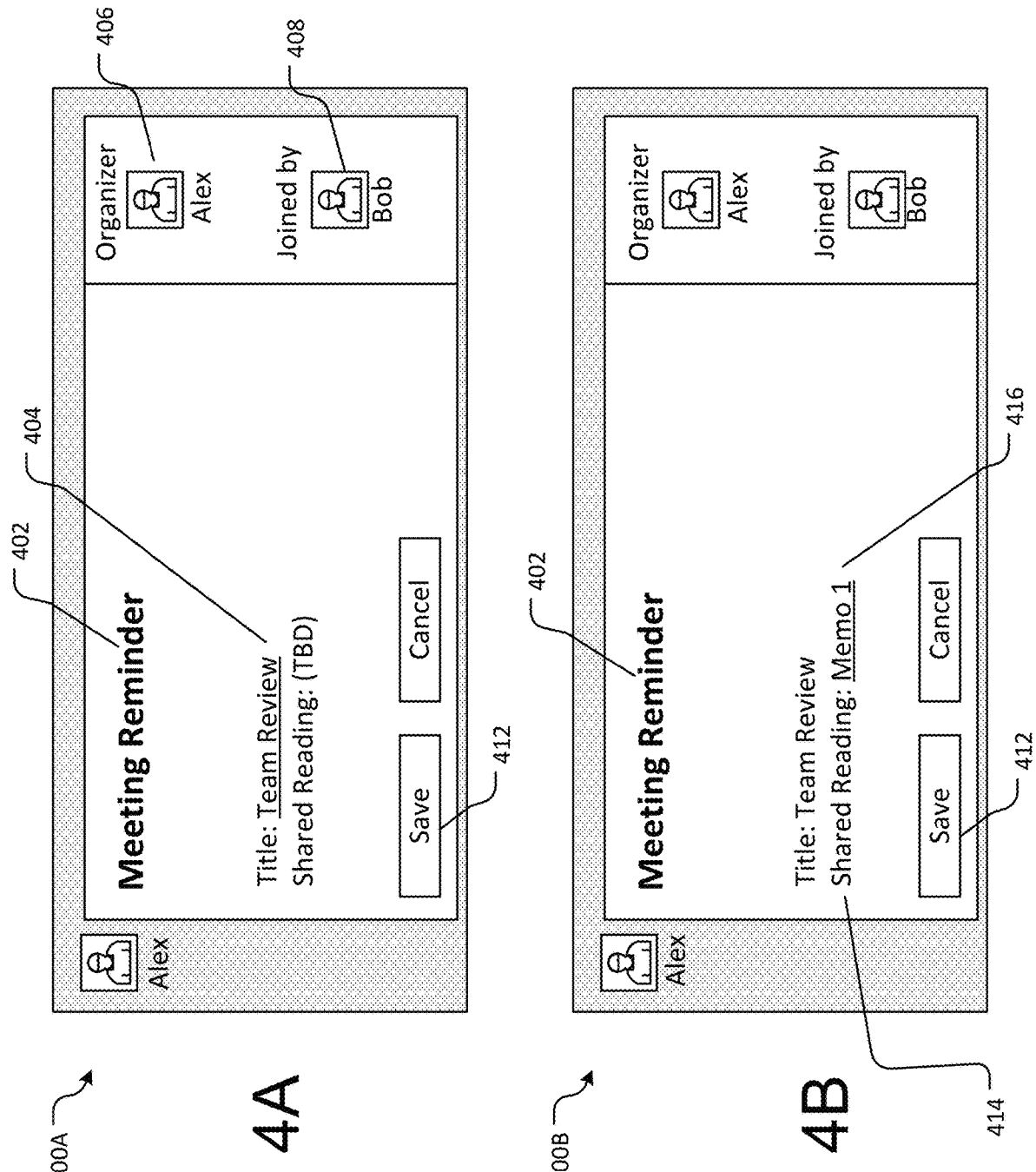

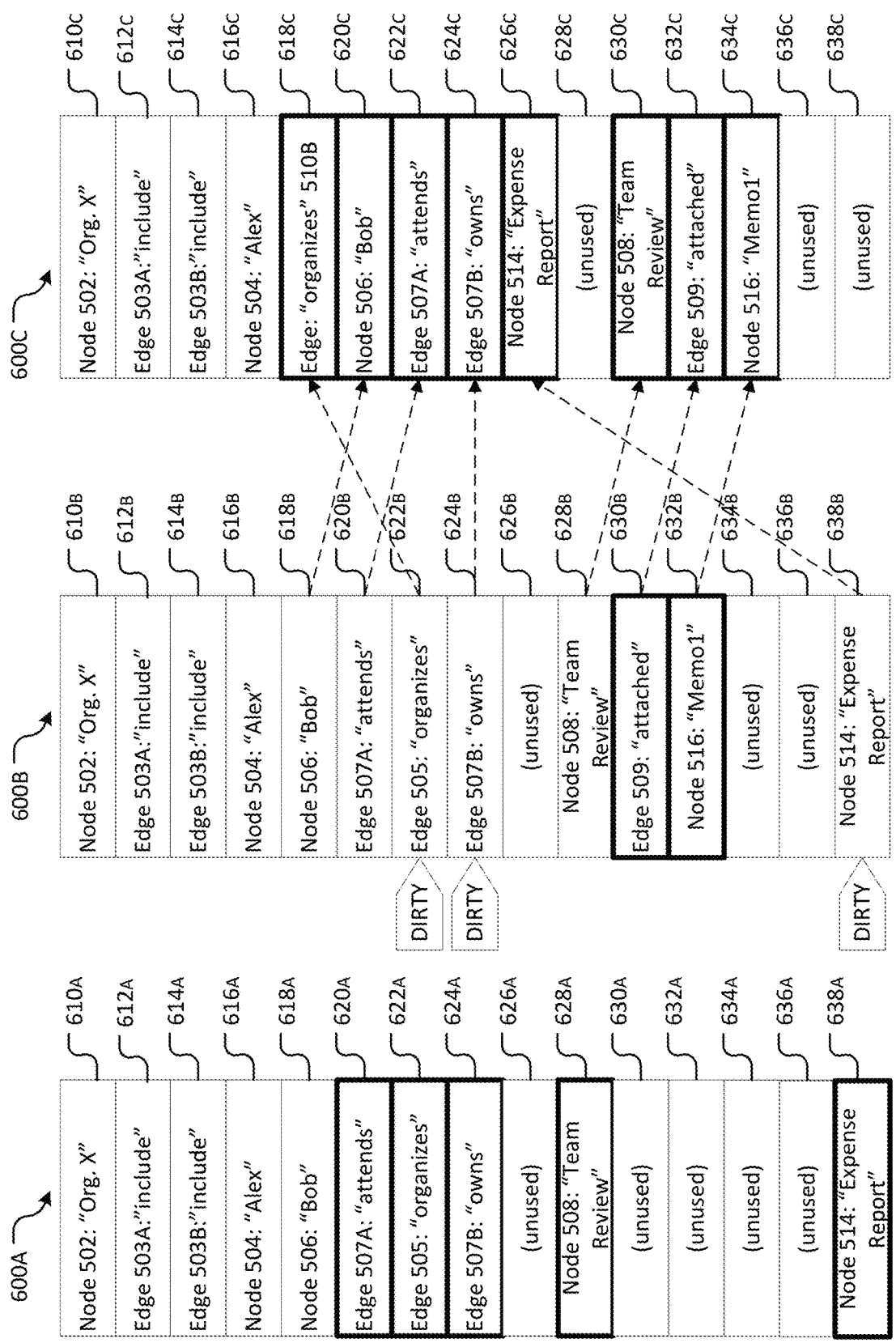

OPTIMIZED RECORD PLACEMENT IN GRAPH DATABASE

BACKGROUND

Graph databases have become popular because of their high performance in returning search information by efficiently traversing nodes through edges within the graph. Graph databases may store information in different types of nodes, such as a person node, a file node, a task node, a mail node, a document node, a calendar event node, a meeting node, a memo node, etc., depending on domains in which the graph databases are used. The nodes may have associated properties and/or be associated with other nodes (e.g., a person node may be associated with a task node, etc.). Such nodes are connected by edges, which may define relationships between the nodes that the edges connect. Edges may also have associated properties. Nodes and edges of graph databases may be modified as information evolves over time. Graph databases may be used in a distributed environment where some parts of a graph resides in one location and other parts of the graph residing in other locations. Graph databases may also be used in a local environment where parts of a graph are in CPU caches while other parts are in onboard memories or on hard disks.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues may be resolved by optimized record allocations within memory for a graph database and minimized data fragmentation. For instance, to reduce data fragmentation within the graph database, upon receiving a write request, the methods may fetch nodes and edges relating to the write request, estimate a number and location of available records in memory needed for the write request (e.g., based on a rule set), allocate the estimated records, and write data associated with the write request to the allocated records. Moreover, defragmenting records in a graph database may be facilitated by reallocating and relocating records based on a set of rules for determining a number of records necessary for related nodes, edges and properties, as well as determining record placement within storage (e.g., volatile or non-volatile memory, disk drive, solid state drive, tape drive, or any other storage media) for a graph database. Records that are found to be fragmented may be marked with a dirty flag based on inspecting records while traversing existing nodes and edges of the graph database (e.g., during a read request and/or a write request). Fragmented records may be defragmented by reallocating the fragmented records, relocating the fragmented records and clearing dirty flags as fragmentation is resolved.

One or more rules of a dynamic ruleset may be derived based on one or more of the following: an on-going statistical evaluation of access patterns associated with the graph database, one or more policies (e.g., set by a database administrator), system configurations and/or current system characteristics, heuristics, or a combination thereof (hereinafter the "dynamic ruleset"). For example, the dynamic ruleset may be built based on one or more of the following: statistics regarding access patterns on different types of nodes, statistics regarding typical memory requirements for node clusters associated with different types of nodes, global policies regarding relationships between nodes and edges in graph databases, as well as information on system configurations such as but not limited to a size of CPU cache line, a size of on-board memory, availability for memory swapping within a local system as well as across a distributed system, etc.

In aspects, a computer-implemented method for storing data in a graph database is provided. The method includes receiving a request to write the data to the graph database, where the graph database comprises a plurality of nodes, edges and properties, and parsing the request to identify at least one entity, where the at least one entity is related to at least one of a node and an edge within the graph database. The method further includes retrieving a dynamic ruleset for record placement and, based at least in part on the at least one entity and at least a first rule of the dynamic ruleset, determining a number of records for storing the at least one entity in the graph database. Additionally, the method includes allocating the number of records in a contiguous block of records and storing the at least one entity in the allocated contiguous block of records.

In further aspects, a computing device including at least a processing unit and memory is provided. The memory stores computer executable instructions for storing data to a graph database and the instructions when executed by the processing unit cause the computing device to perform one or more operations. The operations include receiving a request to write the data to the graph database, where the graph database comprises a plurality of nodes and edges, and parsing the request to identify at least one entity, where the at least one entity is related to at least one of a node and an edge within the graph database. The operations further include retrieving a dynamic ruleset for record placement and, based at least in part on the at least one entity and at least a first rule of the dynamic ruleset, determining a number of records for storing the at least one entity in the graph database. Based at least in part on the at least one entity and at least a second rule of the dynamic ruleset, the operations include determining a location in memory for storing the at least one entity, allocating the number of records in a contiguous block of records at the location in memory, and storing the at least one entity in the allocated contiguous block of records.

In still further aspects, a computer storage medium is provided. The computer storage medium stores computer executable instructions for storing data in a graph database and the instructions, when executed by at least one processing unit, cause the at least one processing unit to perform one or more operations. The operations include receiving a request to write the data to the graph database, where the graph database comprises a plurality of nodes and edges, and parsing the request to identify at least one entity, where the at least one entity is related to at least one of a node and an edge within the graph database. The operations further include retrieving a dynamic ruleset for record placement and, based at least in part on a first rule of the dynamic ruleset, determining a number of records for storing the at least one entity in the graph database. Based at least in part on the at least one entity and at least a second rule of the dynamic ruleset, the operations also include determining a location in memory for storing the at least one entity, where the location is proximate to at least one of the related node and the related edge, and allocating the number of records in a contiguous block of records at the location in memory.

Additionally, the operations include storing the at least one entity in the allocated contiguous block of records.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 4A-4B illustrate examples of a graphical user interface (GUI) according to an example system.

FIGS. 6A-6C illustrate examples of record layouts according to examples.

DETAILED DESCRIPTION

Figure 1A:
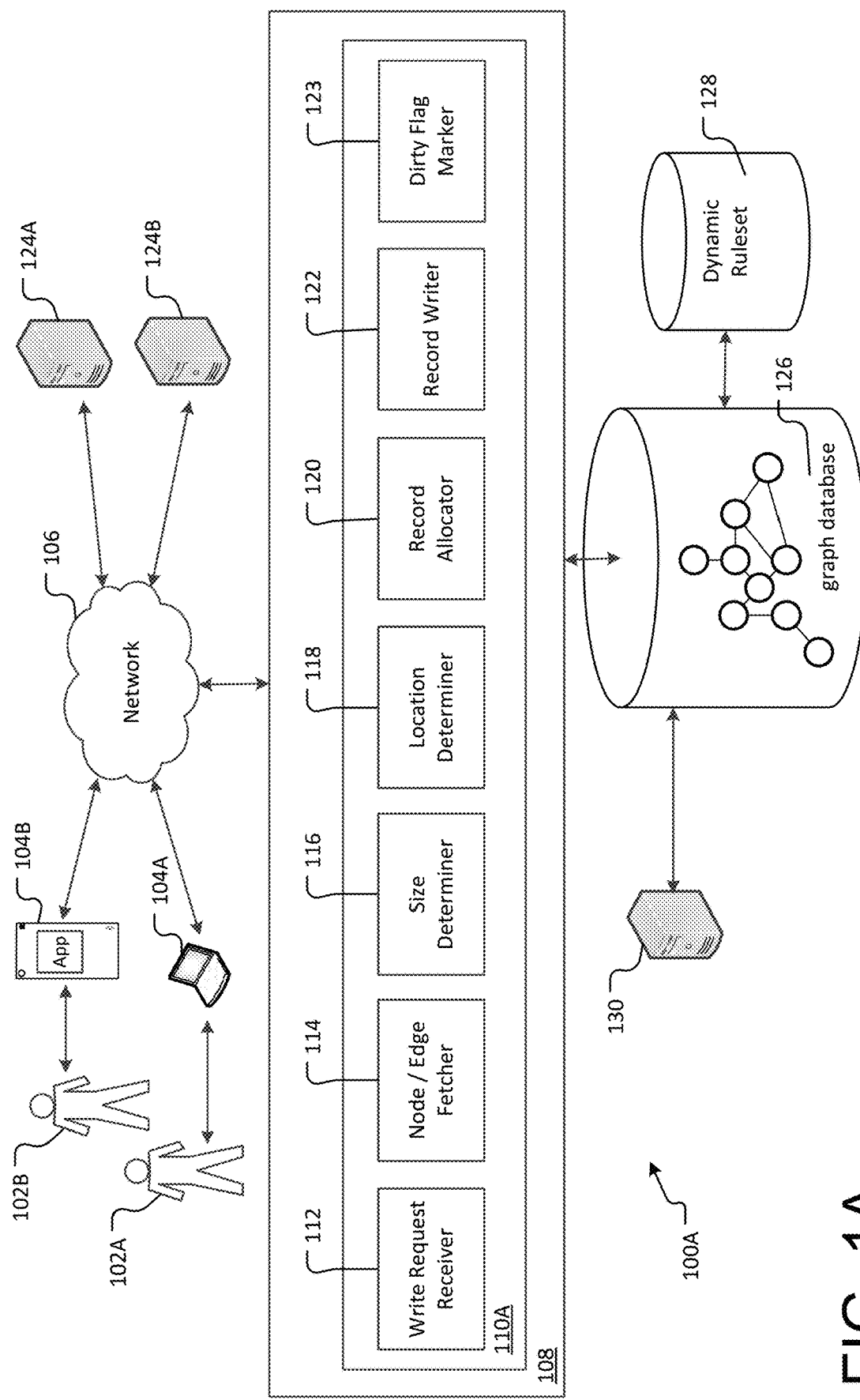
FIGS. 1A-1B illustrate an overview of an example system for allocating and optimizing record placement in a graph database.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods for optimizing record placement in a graph database. Use of graph databases has become popular because graph databases provide high performance in returning search information by efficiently traversing information stored in the graph. Unlike other types of databases, such as relational databases, a graph database consists of nodes that are interconnected by edges. Various types of nodes may be stored in a graph database.

For example, types of nodes may be based on entities such as but not limited to a person, an organization, a file, a task, a mail, a document, a calendar event, a meeting, a memo, a reminder, etc. An edge (or relationship) connects two nodes. There may be different types of edges (or relationships) depending upon the associations between the nodes. For example, one node may be associated as a property of another node (e.g., as a meeting time of a meeting node), one node may be associated as an attachment to another node (e.g., as an attached document to an email node), one node may be associated as an attendee of another node (e.g., as a person attendee of a meeting node), etc. Such associations may further depend on domains of the information that a graph database may be storing (e.g., an email domain, a contacts domain, a calendar domain, etc.). Additionally, while in some cases properties may be stored as nodes, properties may alternatively be associated as data to either a node or an edge.

For example, when users and meetings are modeled as nodes in a graph database, relationships (e.g., edges) may include but are not limited to "attended," "organized," "edited," "audited," etc. Edges (or relationships) may also be unidirectional or bidirectional, which may affect how the nodes and edges are traversed during a read request. In effect, nodes and edges may form a web-shape graph. As detailed above, entity nodes may be associated with properties, which may differ based on the node type. That is, a person node may be associated with properties such as a name, a team affiliation, contact information, etc., whereas a meeting node may be associated with properties such as a title, a time, a date, a location, etc.

For example, a meeting node may have properties (or attributes) such as but not limited to a title (or subject) of the meeting (e.g., "Discuss Product Launch Strategy"), a shared reading list for discussion at the meeting (e.g., "review product specs and budget"), a time and date of the meeting (e.g., 11:00 am, UTC-8, Monday, Apr. 3, 2017), a location of the meeting (e.g., Conference Room 5), etc. The meeting node may also be associated with other entity nodes by a relationship, e.g., a first person node related as "organizer" or "organized" to the meeting node, a second person node related as "attendee" or "attended" to the meeting node, a first document node (e.g., a PDF document entitled "Product Specification") related as "attached" to the meeting node, a second document node (e.g., an EXCEL document entitled "Product Budget") related as "attached" to the meeting node, and the like. Graph databases may provide high performance during search operations by efficiently traversing related nodes and edges. However, where memory records associated with the nodes and edges are interleaved with memory records associated with unrelated nodes and edges (e.g., resulting in fragmentation of the graph), traversal of the graph becomes less efficient.

In some aspects, a property may be associated as data to a node or an edge. That is, a property may be a piece of data that is logically stored "on" a node or an edge. For example, properties may be stored in records, similar to nodes and/or edges, and may be referenced from a node and/or edge record by a record identifier (ID). In other aspects, a property of a node may be in a key-value pair form, where a key (e.g., edge type) is paired with a value (e.g., alphanumeric value) stored in a property node related by the edge to the node. For example, for a meeting attended by a person named Joe, the key (e.g., edge type "attended") may be paired with a value (e.g., "Joe") in a property node related to a meeting node. In another example, for a document created on Jun. 12, 2016, the key (e.g., edge type "created") may be paired with a value (e.g., "Jun. 12, 2016") in a property node related to a document node. In still other aspects, a cluster of nodes (e.g., including associated edges) describing various aspects (e.g., organizer, attendees, attached documents, time, date, location, etc.) of an entity (e.g., a meeting) may be referred to as "properties" of the entity (e.g., the meeting).

Efficient traversal of graph databases may be implemented by deploying the concept of index-free adjacency. Index-free adjacency relies on fixed-sized, adjacent records to store data in the graph database, thereby eliminating costly translations and look ups on indexes while traversing the graph. According to index-free adjacency, each record lies at a certain offset into a file, which corresponds to a record index/number (e.g., record ID) divided by the record size. In some cases, records may be spread over multiple files, where parts of the record ID correspond to a specific file and remaining parts correspond to a record in that file. Similar to retrieving an item using an array, a file corresponds to an array reference (e.g., location of a first record), a record ID corresponds to an index of an item in the array, and a record size corresponds to an item size. In this way, if the file starts at memory location "X", and the record size is "Y", the position of a record can be calculated from its record ID "Z" according to the formula: position=X+(Y*Z), which is constant time. Reading a record is thus a constant cost operation, which is cheaper than the alternative of locating a given record by going through an index (e.g., which is an O(log(n)) complexity operation). In this way, where related nodes and edges are stored in contiguous or nearby memory locations (e.g., within contiguous or closely-placed records), translations (or hops) within memory are minimized when traversing the graph database.

Graph databases, however, may become fragmented, particularly when accessed by multiple users concurrently. Data fragmentation refers to the non-adjacent (or non-contiguous) storage of related records in memory. When a graph database becomes fragmented, records storing related nodes or edges may be scattered across the database storage medium (or media), such that multiple read operations and/or translations may be required to read a set of closely-related nodes and edges from the graph database. For instance, nodes and edges that are accessed and processed together may be residing in distant memory locations within the graph structure.

Record-based storage formats may become fragmented during concurrent write requests. For instance, fragmentation may occur when record-based storage methods allocate records linearly when writing data. Thus, when concurrent (or substantially concurrent) writing requests are received, the first write request may be assigned to a first linear record and the second write request may be assigned to a second linear record. In aspects, rules of record allocation (e.g., the dynamic ruleset) may disallow different write requests from being assigned to the same record, and the determination of which of two concurrent write requests is assigned to the first linear record may be conducted by any suitable means. For instance, "concurrency" may include write requests that are received at substantially the same time (e.g., within the same minute), but actual receipt of the two write requests (e.g., in hundredths or thousandths of a second) may determine which write request is assigned to the first linear record. Alternatively, concurrent write requests may be randomly or otherwise assigned to the first linear record.

Returning to the above example, if the first write request contains more data than can be stored in the first linear record, a third linear record may be allocated to complete the first write request, thereby resulting in data associated with the first and second write requests occupying interleaved (non-contiguous) records within memory. With reference to storing data to a graph database, the first write request may involve writing a set of related nodes and edges, such as when creating a calendar event. The second write request may also involve writing related nodes and edges (e.g., when adding a person as a contact) and may be received concurrently (or substantially concurrently). In this case, using the example above, if the first linear record and the third linear record are assigned to the first write request and the second linear record is assigned to the second write request, data related to the calendar event will be interleave in memory with data related to the person. Even if methods are employed, for example, to ensure that all data related to a given entity (e.g., person, meeting) is placed contiguously, the problem remains. This is because additional properties related to an entity may be added at any time and, as the record file grows, the pool of candidate record identifiers (IDs) changes.

A graph database may also become fragmented when a write request updates or adds data related to an existing node in the graph (e.g., adding a person as an additional attendee to an existing meeting node). In this case, the new information (new person node related as "attendee" to the meeting node) may be written to the next available linear record, which may be in a distant memory location from the records storing the meeting node, edges, and other related nodes. Non-contiguous records that are related to the set of associated nodes and edges may result in requiring multiple read operations when reading the set of associated nodes. For a graph database to provide high-performance search operations through efficiently traversing the nodes through edges, it is important that records are not severely fragmented.

Data fragmentation in a graph database may be an issue for a variety of reasons. For instance, if records are smaller in size than CPU cache lines (128 bytes per cache, for example), parts of data in each cache may be irrelevant to a read/write request to the graph database under execution and thus may waste data in cache. On the other hand, missing relevant record data in cache may be very costly because of the longer time required to access and read data from memory and from hard disk devices. Existing records management such as file cache, memory swapping and memory defragmentation may be ineffective because file systems may decide cache operations without considering data access patterns in graph databases.

To address the above issues related to fragmentation of graph databases, in terms of both minimizing fragmentation when writing data and facilitating defragmentation when it occurs, the present methods and systems optimize record placement in graph databases. That is, the present methods and systems address these issued by defragmenting the data on the record level by placing data that is frequently accessed together contiguously in memory. In some aspects, a set of rules may be developed (e.g., a dynamic ruleset) based on dynamically analyzing how applications interact with the graph database, among other considerations (e.g., policies, system characteristics, etc.). For example, statistics regarding queries on the graph may be collected to support the correct placement of edge records. When queries are executed on a graph database, edges are always traversed between nodes. As such, edges between nodes should be collocated with at least one of the nodes to which it is connected. However, due to the sheer number of related nodes and edges, which may have been written to the graph at different times, this may not be feasible. Based on statistics regarding normal query patterns, global policies, system characteristics and/or other heuristics, the systems and methods may identify an optimal position for certain types of edges that are often traversed with respect to particular types of nodes.

For instance, the following information is considered during query execution, specifically when edges are being followed (traversed) from one node to another: (1) the type of edge being traversed; (2) the type of the node being traversed from; and (3) the type of the node being traversed to. This allows the query execution engine to build statistics about whether it is most common to go from or to a certain node type when traversing an edge of a given type. For example, consider a graph that contains three different types of edges, Ea, Eb and Ec, and two types of nodes, Nx, and Ny. Further, access patterns on the graph, e.g., queries being executed, are such that the queries originating from Nx most often follow edges of type Ec, less frequently edges of type Eb, and only rarely traverse edges of type Ea, which would be reflected in the order records are placed relative to each other in the record file (Ec before Eb before Ea). Queries originating from Ny nodes might have other characteristics, e.g., Ea may be the most frequently used edge type, which would result in edge records being placed accordingly when collocated with nodes of type Ny. Consider a social graph, where for example "friend" edges are used more frequently, possibly due to being relevant in more experiences, than "spouse" edges. Ordering can be done on a global or per-node basis, which layout ensures good utilization of caches throughout the memory and storage hierarchy. Additionally, it may be possible to implement a specific optimization when all edges of a specific type are placed contiguously. In this case, during query execution, it is possible to terminate early when all edge records of the desired edge type(s) (subject to the query predicates) have been read. Alternatively, when edge records are not sorted by type, all records must be read to ascertain that no edges are overlooked.

One way of maintaining such statistics would be to keep a record per edge type, and in that record keep counts of how many times edges of this type have been traversed from each node type. In this way, the properties most frequently used (and thus the records used to describe those properties) for a node/edge may be placed closer to an entity/edge than those less frequently used. It should be noted that the statistics governing this placement can be global or on a per node/edge basis. One example of a global trait is that a given type of property is most likely accessed when evaluating a certain type of node. An example of a per-node metric is that queries evaluating a node with a specific ID usually inspect specific properties in a specific order. Determining which policy is best suited may be subject to the desired system characteristics.

Based on a dynamic ruleset, e.g., derived based on the statistical analysis described above, policies, system characteristics and/or other heuristics, when a write request is received, the write request may be evaluated to determine a number and location of records to allocate, such that records storing certain types of nodes and edges may be placed contiguously when possible. Additionally, when fragmentation of record placement does occur, fragmented records within a graph database may be identified, related nodes, edges and/or properties to data within the fragmented records may be identified, a location of the related nodes/edges/properties within memory may be determined, and contiguous records may be reallocated at the determined location based on the same dynamic ruleset for optimizing writing records to a graph database. It is with respect to these and other general considerations that embodiments have been made.

FIG. 1A illustrates an overview of an example system for optimized record placement in a graph database.

System 100A may include one or more client computing devices 104 (e.g., client computing devices 104A and 104B) that may execute a client version of a record placement application (e.g. graph database management application) capable of optimizing record placement in a graph database. In some examples, the client record placement application may execute locally on a client computing device 104. In other examples, a client record placement application (e.g., a mobile app on a thin client computing device 104) may operate in communication (e.g., via network 106) with a corresponding server version of record placement application 110A executing on one or more server computing devices, e.g., server computing device 108. In still other aspects, rather than executing a client version of a record placement application, the one or more client computing devices 104 may remotely access, e.g., via a browser over network 106, the record placement application 110A implemented on the server computing device 108 or multiple server computing devices (e.g., in a distributed computing environment such as a cloud computing environment).

As illustrated by FIG. 1A, a server version of record placement application 110A is implemented by server computing device 108. As should be appreciated, the server version of record placement application 110A may also be implemented in a distributed environment (e.g., cloud computing environment) across a plurality of server computing devices (not shown). Moreover, as should be appreciated, either a client or a server version of the record placement application 110A may be capable of controlling access to one or more electronic files in a document storage site. While a server version of the record placement application 110A and associated components 112-122 are shown and described, this should not be understood as limiting. Rather, a client version of record placement application 110A may similarly implement components 112-122 on a client computing device 104.

In a basic configuration, the one or more client computing devices 104 may be personal or handheld computers having both input elements and output elements operated by one or more users 102 (e.g., user 102A and user 102B). For example, the one or more client computing devices 104 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing the record placement application 110A may be utilized.

In some aspects, network 106 is a computer network such as an enterprise intranet, an enterprise extranet and/or the Internet. In this regard, the network 106 may include a Local Area Network (LAN), a Wide Area Network (WAN), the Internet, wireless and wired transmission mediums. In further aspects, server computing device 108 may communicate with some components of the system via a local network (e.g., an enterprise intranet), whereas server computing device 108 may communicate with other components of the system via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

As described above, the record placement application 110A may be implemented on a server computing device 108. In a basic configuration, server computing device 108 may include at least a processing unit and a system memory for executing computer-readable instructions. In some aspects, server computing device 108 may comprise one or more server computing devices 108 in a distributed environment (e.g., cloud computing environment). Server computing device 108 may generate, store and/or access electronic files and documents (and any associated content, attributes or properties) stored in a graph database 126. Such electronic files and documents (and any associated content, attributes or properties) may also be generated, stored and/or accessed in graph database 126 by the one or more client computing devices 104 and/or one or more other server computing devices (e.g., server computing devices 124A and/or 124B) via network 106. In some aspects, graph database 126 may be managed or maintained by one or more other server computing devices 130, which may include at least a processing unit and system memory (including cache memory) for executing computer-readable instructions.

The record placement application 110A may include various components for optimizing record placement in a graph database, including a Write Request Receiver 112, Node/Edge Fetcher 114, Size Determiner 116, Location Determiner 118, Record Allocator 120, and Record Writer 122. In aspects each component may communicate and pass data between the other components. The various components may be implemented using hardware, software, or a combination of hardware and software. Moreover, the various components may be executed on a single server computing device (e.g., server computing device 108), on multiple server computing devices (e.g., server computing devices 124A, 124B and/or 130), or locally on one or more client computing device (e.g., client computing device 104A and/or 104B).

In aspects, Write Request Receiver 112 may receive a request to write records to a graph database 126. As described above, records in a graph database may comprise nodes and edges, as well as associated properties. Various types of nodes include but are not limited to a person node, a file node, a task node, a mail node, a document node, a calendar event node, a meeting node, a memo node, a reminder node, etc. Nodes may be related to other nodes (of the same or different type) by edges. That is, edges may represent relationships between nodes. In some aspects, relationships may be specific to a domain. For example, when users and meetings are modeled as nodes in a graph database, relationships may include but are not limited to "attended," "organized," "edited," "audited," etc.

In some aspects, Write Request Receiver 112 may receive a write request from a computing device (e.g., one or more client computing devices and/or one or more serving computing devices) via the network 106. A write request may comprise data to be written to the graph database 126 (e.g., data associated with one or more entities related to one or more other entities or properties). As used herein, an entity may be the subject to which the data relates (e.g., a person, a meeting, a calendar event, a document, etc.) and a property may describe or modify the entity (e.g., a name, a title, a time, a date, etc.). In some cases, the write request may include data directed to a number of entities (e.g., a meeting with a person organizer, one or more person attendees and one or more attached documents). When written to a graph database, an entity may be stored in a node of a node type corresponding to the entity (e.g., a person node, a meeting node, a document node, etc.) and may be linked to another node (e.g., person node, document node, etc.) by an edge of an edge type corresponding to a relationship (e.g., relationships such as "attendee," "organizer," "attached," etc.). Properties, as described above, may be associated as pieces of data (e.g., values) to either nodes or edges.

In some aspects, Write Request Receiver 112 may parse the write request to extract entities and/or properties. Write Request Receiver 112 may also identify one or more existing entities (e.g., nodes in the graph database) to which the write request relates (e.g., an updated time to an existing meeting, edits to an existing document, a new phone number for an existing person, etc.).

Node/Edge Fetcher 114 may fetch or retrieve existing nodes, edges and/or properties that Write Request Receiver 112 has identified as related to the write request. In this case, processing the write request may involve creating one or more nodes and edges related to the fetched existing nodes. In some aspects the Node/Edge Fetcher 114 may traverse (e.g., read) the graph database 126 to locate one or more nodes that are related to the received write request. In some aspects, results from fetching may determine a location of writing new nodes and edges within the graph structure.

Size Determiner 116 may determine (or estimate) a memory requirement for storing the data associated with the write request. In aspects, the memory requirement may be determined (or estimated) as a number of bytes of memory. For instance, Size Determiner 116 may evaluate an amount of data contained in the write request to determine the memory requirement for the write request. Additionally or alternatively, Size Determiner 116 may evaluate the one or more identified entities of the write request to estimate the memory requirement for the write request. Based on statistical data, policies, system characteristics and/or other heuristics, the memory requirements for particular types of nodes (or node clusters) typically representing entities of the write request may be identified. That is, based on statistics regarding normal query patterns, the systems and methods may identify an optimal position for certain types of edges that are often traversed with respect to particular types of nodes. For instance, the write request may specify an entity corresponding to a particular type of node, such as but not limited to a person. In a non-limiting example, if a size of a person node with associated edges is typically 24 bytes, then it may be determined that the memory requirement for the person entity is about 24 bytes. Similarly, the memory requirements for other entities included in the write request may be estimated.

In aspects, an estimated memory requirement for an entity may be more or less than the actual memory requirement for entity data contained in the write request. That is, while a person node may typically require about 24 bytes of memory based on the dynamic ruleset, the typical person node may be described by more or fewer properties (e.g., contact information, job title, avatar or photo, etc.) than the person entity of the write request. However, based on the dynamic ruleset, the system may account for additional data that is likely to be added to one or more nodes of the write request in the future. Even so, allocating open memory in anticipation of future data for a node may be balanced against wasting memory resources, as described further below. In an example, inserting a node (e.g., comprising an entity) may typically involve creating at least one edge to an existing node in the graph database. For instance, a person node in the write request may be connected by a new edge defining a relationship "include" to an existing node associated with "Org. X" (an organization called X). The "include" edge may be absent from the write request, but Size Determiner 116 may include the "include" edge in determining the memory requirement for the write request. As should be appreciated, other relationships between entities in the write request and existing nodes within the graph database may also be accounted for, as necessary.

After determining a memory requirement for the write request (based on methods described above, or any combination thereof, or any other suitable method), a number of records may be determined. As noted above, record-based memory systems rely on fixed-sized records. In this case, the determined memory requirement may be divided by the fixed size of a record to determine the number of records needed. For example, for a determined memory requirement of 32 bytes, and a fixed-record size of 24 bytes, Sized Determiner 116 may determine that 1.33 records are needed. As partial records cannot be assigned, the system may determine that at least two records are needed for storing the data of the write request.

Location Determiner 118 may determine at least one location in the graph database for processing the write request. For instance, as described above, it may be determined that processing the write request involves creating one or more new edges defining one or more relationships between data in the write request (e.g., one or more entities) and one or more existing nodes within the graph database. In aspects, Location Determiner 118 may determine one or more locations of records storing the related one or more existing nodes within memory. After determining locations of one or more records storing the related one or more existing nodes within memory, Location Determiner 118 may identify unused records within nearby memory to the determined locations. Upon identifying unused records, the Location Determiner 118 may determine whether a number of unused records is greater or equal to the number of records determined for storing the write request. If so, the method may pass to Record Allocator 120; if not, Location Determiner 118 may identify and evaluate additional unused records.

As should be appreciated, if the determined number of records for storing the write request is more than one record, Location Determiner 118 may seek to identify a block (or chunk) of unused records. As used herein, a "block of records" is a linear set of more than one contiguous record. Similarly, a "block of unused records" is a linear set of more than one contiguous unused record. That is, if writing an entity with a number of properties will consume N records, the execution engine may be granted a single chunk of N contiguous records, rather than N single records which might or might not be contiguous depending on the current query load. In some cases, when a block of unused records is unavailable or insufficient in memory near records storing related nodes, a sufficient block of unused records (e.g., greater than or equal to the number of records determined for storing the write request) may be identified in a more distant location in memory and, in some cases, the distant block of records, the existing block of records (comprising the related existing nodes), and/or the entities or properties of the write request may be marked by dirty flags (e.g., in a defragmentation queue), as detailed further below.

In some aspects, one or more rules of the dynamic ruleset for optimizing record placement in a graph database may include but are not limited to the following: (1) arrange records corresponding to the same property contiguously, i.e. when one record is insufficient to hold the data of a property; (2) Place property data that is more frequently used (e.g., globally or on a per-entity basis) in the context of an entity (node or edge) closer to the entity, thus facilitating early termination (e.g., of queries); (3) allocate contiguous records to store edges with their corresponding property records belonging to a node; (4) sort edge records by edge type to facilitate early termination; (5) place an edge record adjacent to the node which, based on query pattern statistics, is most likely to be the node that the edge record is traversed from. The dynamic ruleset may be updated by various means such as but not limited to dynamically reflecting changes in statistics of read and write requests and programmatically updating based on user preferences for system characteristics. In some aspects, unused records may be allocated as reserved records when allocating records for a write request. The reserved records may be over-allocated in anticipation of populating the records with data in subsequent write or update requests.

Record Allocator 120 may allocate and reserve at least one block of records in the graph database 126. For instance, Record Block Allocator 120 may use a number and location of records determined by Size Determiner 116 and Location Determiner 118 to allocate records for the write request.

Record Writer 122 may write data of the write request to the block of allocated records at the designated location in the graph database 126. The write operation may be performed concurrently with one or more write requests while ensuring atomicity, consistency, isolation and durability of the processing by operating transaction methods such as two-phase lock protocols.

In some cases, Dirty Flag Marker 123 may mark dirty flags ON for records and/or entities that Node/Edge Fetcher 114 has identified as violating one or more rules of record placement, e.g., based on the dynamic ruleset 128. In some aspects, marking an entity (i.e., edge or node) as dirty amounts to identifying any record or records comprising the entity and marking such records as dirty. Thus, with respect to the example above, both the newly allocated batch of records (at the distant location), as well as the pre-existing records comprising the entity or entities being updated, would essentially be marked as dirty by virtue of the dirty entities that these records comprise (i.e., whether or not a dirty flag is actually placed on the records). In other aspects, where marking records as dirty serves as an indication of when to trigger defragmentation, both the records and the entities they comprise may be marked as dirty. In this case, each entity (e.g., node or edge) that is not collocated with related entities (e.g., node or edge) may be marked as dirty and placed on the defragmentation queue; additionally, some (or all) of the records comprising such dirty entities may also be marked dirty. In this way, dirty flags on records may serve as a metric for fragmentation, whereas dirty flags on entities (or presence within the defragmentation queue) may serve to define the particular entities (with their corresponding records) that should be defragmented.

In aspects, both existing entities and entities written when processing the write request (as well as their corresponding records) may be subject to being marked as dirty. Additionally or alternatively, records violating placement rules may be detected during read queries, which may set dirty flags and/or schedule a node or edge for defragmenting in much the same way as processing during a write request. Moreover, detecting dirty entities during read requests may better cover scenarios where the graph database is periodically re-created from a large dataset (e.g., every month or on any other periodic schedule). In cases where dirty records serve as a metric for fragmentation, a log of dirty flags may be stored by record placement application 110, e.g., in any suitable data store. For example, whenever data is written to an existing entity (e.g., node or edge), for example altering an existing property or adding new properties, a check may be made to verify whether or not the new data is collocated with (e.g., adjacent or near) other data belonging to the existing entity. If not, the existing entity (e.g., the entity being updated by the write request) and the new data (e.g., data written by the write request) may be marked as dirty and put in a "defragmentation queue." Defragmentation of such dirty entities may occur by consuming this queue, where dirty items are retrieved and defragmented. Additionally or alternatively, whenever an edge is added to a previously created node, and the edge should be collocated with that node but is not, the node may be marked as dirty and be scheduled for defragmentation as discussed above for new data/properties on existing entities (e.g., nodes/edges). The dirty node may be placed in the same or a separate queue for defragmentation and, in some cases, a different policy than that used for defragmenting entities (e.g., nodes/edges) with properties/data may be in order.

Figure 1B:
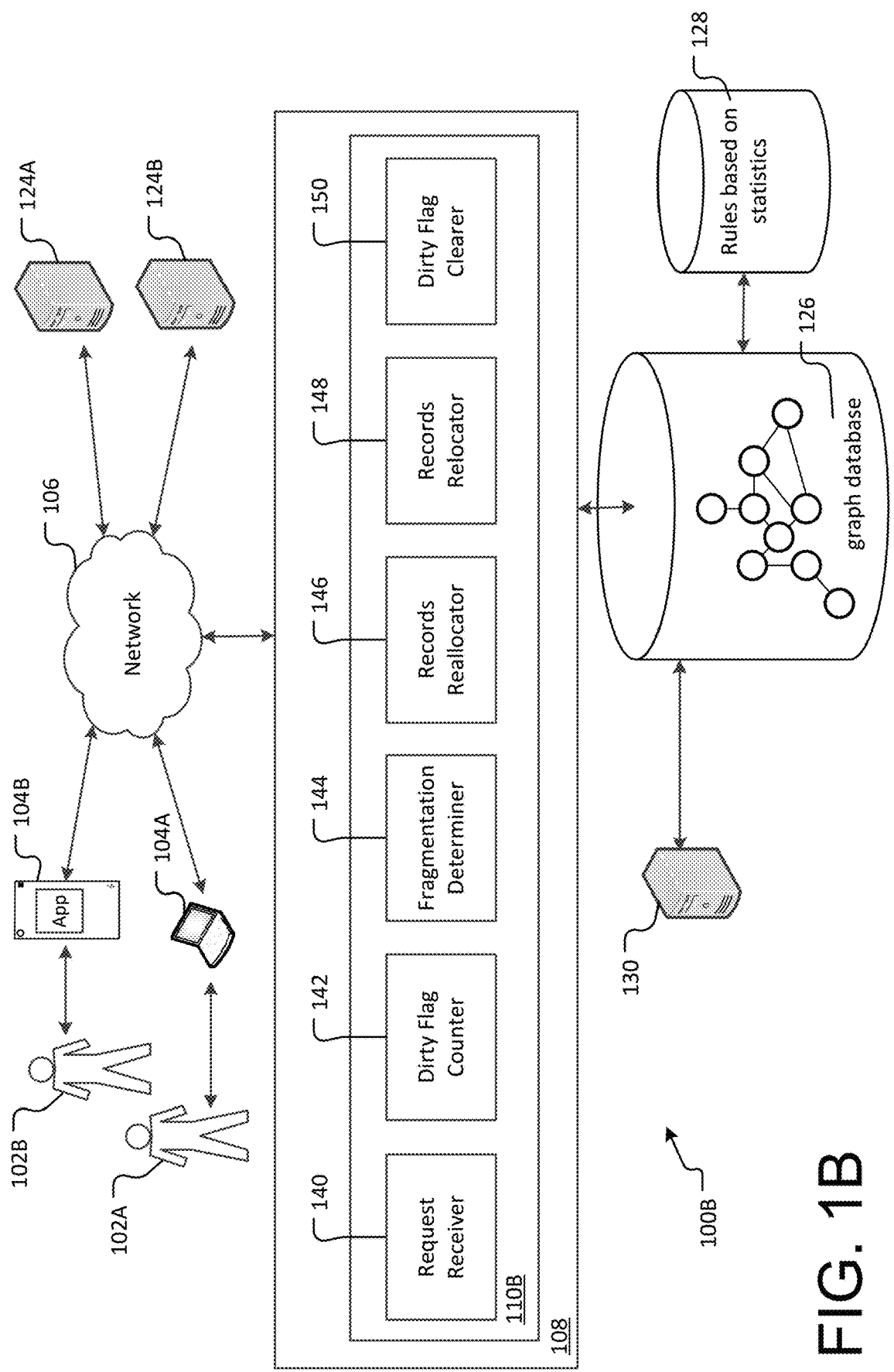

FIG. 1B illustrates an overview of an example system for optimized record placement in a graph database, including detecting fragmented records and defragmenting the fragmented records to improve performance of a graph database.

As described above with respect to System 100A, System 100B may include one or more client computing devices 104 (e.g., client computing devices 104A and 104B) operated by users 102A and 102B and one or more server computing devices, e.g., server computing devices 108, 124A, 124B and/or 130. Such devices may communicate over network 106, as described above.

As illustrated by FIG. 1B, a server version of record placement application 110B is implemented by server computing device 108. As should be appreciated, the server version of record placement application 110B may also be implemented in a distributed environment (e.g., cloud computing environment) across a plurality of server computing devices (not shown). Moreover, as should be appreciated, either a client or a server version of the record placement application 110B may be capable of placing records in a graph database. While a server version of the record placement application 110C and associated components 140-150 are shown and described, this should not be understood as limiting. Rather, a client version of record placement application 110B may similarly implement components 140-150 on a client computing device 104.

The record placement application 110B may include various components for optimizing record placement in a graph database, including Request Receiver 140, Dirty Flag Counter 142, Fragmentation Determiner 144, Records Reallocator 146, Records Relocator 148 and Dirty Flag Clearer 150. In aspects each component may communicate and pass data between the other components. The various components may be implemented using hardware, software, or a combination of hardware and software. Moreover, the various components may be executed on a single server computing device (e.g., server computing device 108), on multiple server computing devices (e.g., server computing devices 124A, 124B and/or 130), or locally on a client computing device (e.g., client computing device 104A or 104B).

In aspects, Request Receiver 140 may receive at least one request. For instance, the request may be one of a read request, a write request and a request for defragmentation (e.g., for consuming a defragmentation queue). Receiving the request may serve to trigger processing steps of defragmenting fragmented records in a graph database.

Dirty Flag Counter 142 may count a number of dirty flags with ON status in the graph database by reading dirty flags related to entities (or records). In aspects, dirty flags may be counted equally across all the records in the graph database. Alternatively, dirty flags may be counted with different weights according to attributes of records such as locations of records in the database. In this way, dirty flags may serve as a metric for fragmentation. In some aspects, dirty nodes or edges may be identified and added to a queue during runtime. In this way, dirty flags may be counted from the queue. For instance, as described above, whenever data is written to an existing entity (e.g. node or edge), altering an existing property or adding new properties, a check is made to verify whether or not the new data is collocated with other data belonging to the existing entity. If not, the entity is marked as dirty and put on the defragmentation queue. Defragmentation of such dirty entities may occur by consuming this queue, where dirty items may be retrieved and defragmented. Additionally or alternatively, whenever an edge is added to a previously created node, and the edge should be collocated with that node but cannot be for some reason (e.g., insufficient unused records near records storing the node), the node may be marked as dirty and be scheduled for defragmentation as discussed above for new data/properties on existing nodes/edges. The dirty node may be placed in the same or a separate queue for defragmentation and, in some cases, a different policy than that used for defragmenting nodes/edges with properties/data may be in order.

Fragmentation Determiner 144 may determine whether or not to execute defragmentation. In some cases, defragmentation may be triggered when a defragmentation request is received. In other cases, defragmentation may be triggered when a certain condition or conditions occur, i.e., without receiving a request. For example, a "count" of dirty flags (either on entities or records), which may or may not be weighted, may serve as a trigger for defragmenting the graph database (e.g., by comparing the count to a threshold). Additionally or alternatively, the defragmentation queue may be drained based on desired runtime characteristics. Some examples of satisfying conditions include but are not limited to: (1) detecting that a threshold on a defragmentation queue length is met; (2) detecting deletions of data from one or more records; (3) detecting expiration of a periodic time period for defragmenting (e.g., periodically scheduled defragmentation); (4) detecting that a threshold on some measure of fragmentation within the graph database has been exceeded; (5) detecting that one or more system characteristics have been met (e.g., when new records are added to the record pool or file); and the like.

Records Reallocator 146 may reallocate records during defragmentation. The reallocation may be determined based on the dynamic ruleset for record placement. As noted above, the dynamic ruleset may include one or more rules including but not limited to the following: (1) arrange records corresponding to the same property contiguously, i.e. when one record is insufficient to hold the data of a property; (2) Place property data that is more frequently used (e.g., globally or on a per-entity basis) in the context of an entity closer to the entity, thus facilitating early termination (e.g., of queries); (3) allocate contiguous records to store edges with their corresponding property records belonging to a node; (4) sort edge records by edge type to facilitate early termination; (5) place an edge record adjacent to the node which, based on query pattern statistics, is most likely to be the node that the edge record is traversed from. The dynamic ruleset may be updated by various means such as but not limited to dynamically reflecting changes in statistics of read and write requests and programmatically updating based on user preferences for system characteristics. In some aspects, unused records may be allocated as reserved records when allocating records for a write request. The reserved records may be over-allocated in anticipation of populating the records with data in subsequent write or update requests. Records Reallocator 146 may identify and reserve at least one block of records in the graph database based on determining a number and location of unused records sufficient for the data to be moved during defragmentation.

Records Relocator 148 may relocate existing records to a new record location, as specified by Records Reallocator 146. In some aspects, relocating existing records may involve more than one step of relocating a record, depending on availability of unused records and a location of the reallocated records. Additionally or alternatively, Records Relocator 148 may relocate records that are not fragmented in order to defragment fragmented records. For instance, a record of a node that is not fragmented may be relocated to a new location with records for edges that are fragmented, in order to resolve fragmentation of the records for the edges.

For example, by way of overview, defragmenting entities in a graph database amounts to retrieving entities and their properties, e.g., via a graph query, and moving the data to a new set of records that will allow a better layout of the data. For instance, when defragmenting a node, any edges connected to the node may also be retrieved and collocated with the node. The process of moving this data is generally prohibited while normal graph queries towards the same data are being executed. That is, if queries touching node A are being run in a query processing component of the graph database, node A cannot be concurrently defragmented. In some cases, moving data can result in blocks of unused records. If these blocks are sufficiently large, it is likely that they will be reused to some extent (small pieces might remain unused), but small chunks may be difficult to reuse for new entities and/or properties. To alleviate this problem, entities and their associated data may be "packed." This allows reclaiming small chunks of unused records and reduces storage overhead. However, in this case, the performance cost of constant packing must be balanced against reducing storage overhead.

Dirty Flag Clearer 150 may clear the dirty flag for an entity (e.g., a node or edge) after completing defragmentation of the node or edge. Alternatively, dirty flags may be cleared upon draining the defragmentation queue. Upon clearing the dirty flags, a measure of fragmentation may be below a threshold level.

As should be appreciated, the various methods, devices, components, etc., described with respect to FIGS. 1A and 1B are not intended to limit systems 100A and 100B to being performed by the particular components described. Accordingly, additional topology configurations may be used to practice the methods and systems herein and/or components described may be excluded without departing from the methods and systems disclosed herein.

Figure 2A:
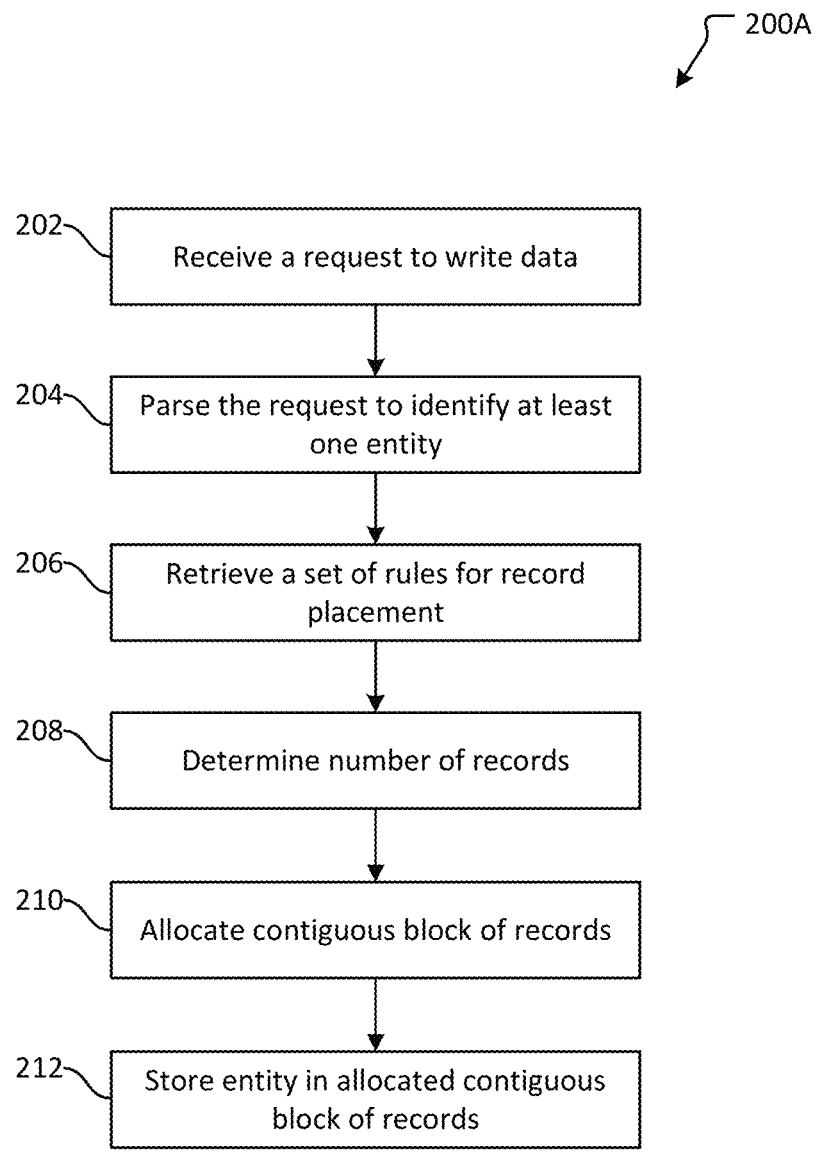
FIGS. 2A-2B illustrate first and second methods of writing records to a graph database.

FIG. 2A illustrates a first method of placing records in a graph database. Method 200A may comprise or be associated with one or more of the record placement technologies described in FIG. 1A.

At receive request operation 202, a request to write data to a graph database may be received. A write request may comprise data associated with one or more entities related to one or more other entities or properties. As used herein, an entity may be the subject to which the data relates (e.g., a person, a meeting, a calendar event, a document, etc.) and a property may describe or modify the entity (e.g., a name, a title, a time, a date, etc.). In some cases, the write request may include data directed to a number of entities (e.g., a meeting with a person organizer, one or more person attendees and one or more attached documents). When written to a graph database, an entity may be stored in a node of a node type corresponding to the entity (e.g., a person node, a meeting node, a document node, etc.) and may be linked to another node (e.g., person node, document node, etc.) by an edge of an edge type corresponding to a relationship (e.g., relationships such as "attendee," "organizer," "attached," etc.). Properties, as described above, may be associated as pieces of data (e.g., values) to either nodes or edges.

At parse operation 204, the write request may be parsed to extract entities and/or properties. Additionally, one or more existing entities (e.g., nodes/edges in the graph database) to which the write request relates (e.g., an updated time to an existing meeting, edits to an existing document, a new phone number for an existing person, etc.). Additionally, in some cases, the related existing nodes and/or edges may be fetched or retrieved. In this case, processing the write request may involve creating one or more nodes and edges (as well as associated properties) related to the fetched existing nodes and/or edges. In some aspects, the graph database may be traversed (e.g., read) to locate one or more existing entities that are related to the write request. In some aspects, as will be described further below, results from fetching existing nodes and/or edges may determine a location for writing new nodes and edges (e.g., associated with the write request) within the graph structure.

At retrieve rules operation 206, one or more rules of a dynamic ruleset for record placement may be retrieved. In aspects, the set of rules may be derived based on access patterns associated with the graph database. In some cases, the set of rules may be statistically derived. For instance, the access patterns may statistically characterize the traversal of edges from one node to another within the graph database for a plurality of queries. Statistically characterizing the traversal of edges may include evaluations such as identifying one or more edge types corresponding to the edges traversed, identifying one or more node types traversed from, and identifying one or more node types traversed to. Moreover, statistically characterizing the traversal of edges may include logging a number of each of the one or more node types traversed from and logging a number of each of the one or more node types traversed to. Rules of the dynamic ruleset for record placement may include one or more of: (1) arranging records corresponding to a property contiguously; (2) placing property data that is more frequently used within a context of the at least one entity in closer proximity to the at least one entity than to at least one other entity; (3) allocating contiguous records for storing edges with corresponding property records of a node; (4) sorting records storing edges by edge type; (5) placing an edge record adjacent to a node that is most likely to be the node traversed from; and the like.

At determine record number operation 208, based at least in part on the extracted entity and at least one rule of the set of rules, a memory requirement for storing the extracted entity (and any associated properties) may be determined. The memory requirement may be determined (or estimated)

as a number of bytes of memory. For instance, an amount of data contained in the write request may be evaluated to determine the memory requirement for the write request. Additionally or alternatively, based on the dynamic ruleset described above, the memory requirements for particular types of nodes (or node clusters) that typically represent the extracted entity may be identified. That is, based on statistics regarding normal query patterns, the systems and methods may identify an optimal position for certain types of edges that are often traversed with respect to particular types of nodes. For instance, the write request may specify an entity corresponding to a particular type of node, such as but not limited to a person. In a non-limiting example, if a size of a person node with associated edges is typically 24 bytes, then it may be determined that the memory requirement for the person entity is about 24 bytes. Similarly, the memory requirements for other entities included in the write request may be estimated.

After determining a memory requirement for the write request, a number of records may be determined. As noted above, record-based memory systems rely on fixed-sized records. In this case, the determined memory requirement may be divided by the fixed size of a record to determine the number of records needed. For example, for a determined memory requirement of 32 bytes, and a fixed-record size of 24 bytes, it may be determined that 1.33 records are needed. As partial records cannot be assigned, the system may determine that at least two records are needed for storing the data of the write request.

At allocate record block operation 210, at least one block of records in the graph database may be allocated and reserved. For instance, allocate record block operation 210 may use the number of records needed for storing the extracted entity to allocate records for the write request. As used herein, a "block of records" is a linear set of more than one contiguous record. That is, if writing the extracted entity with related properties will consume N records, the execution engine may be granted a single chunk of N contiguous records, rather than N single records which might or might not be contiguous depending on the current query load.

At store operation 212, the extracted entity (and any related properties) may be written to the allocated contiguous block of records. The write operation may be performed concurrently with one or more write requests while ensuring atomicity, consistency, isolation and durability of the processing by operating transaction methods such as two-phase lock protocols.

Figure 2B:
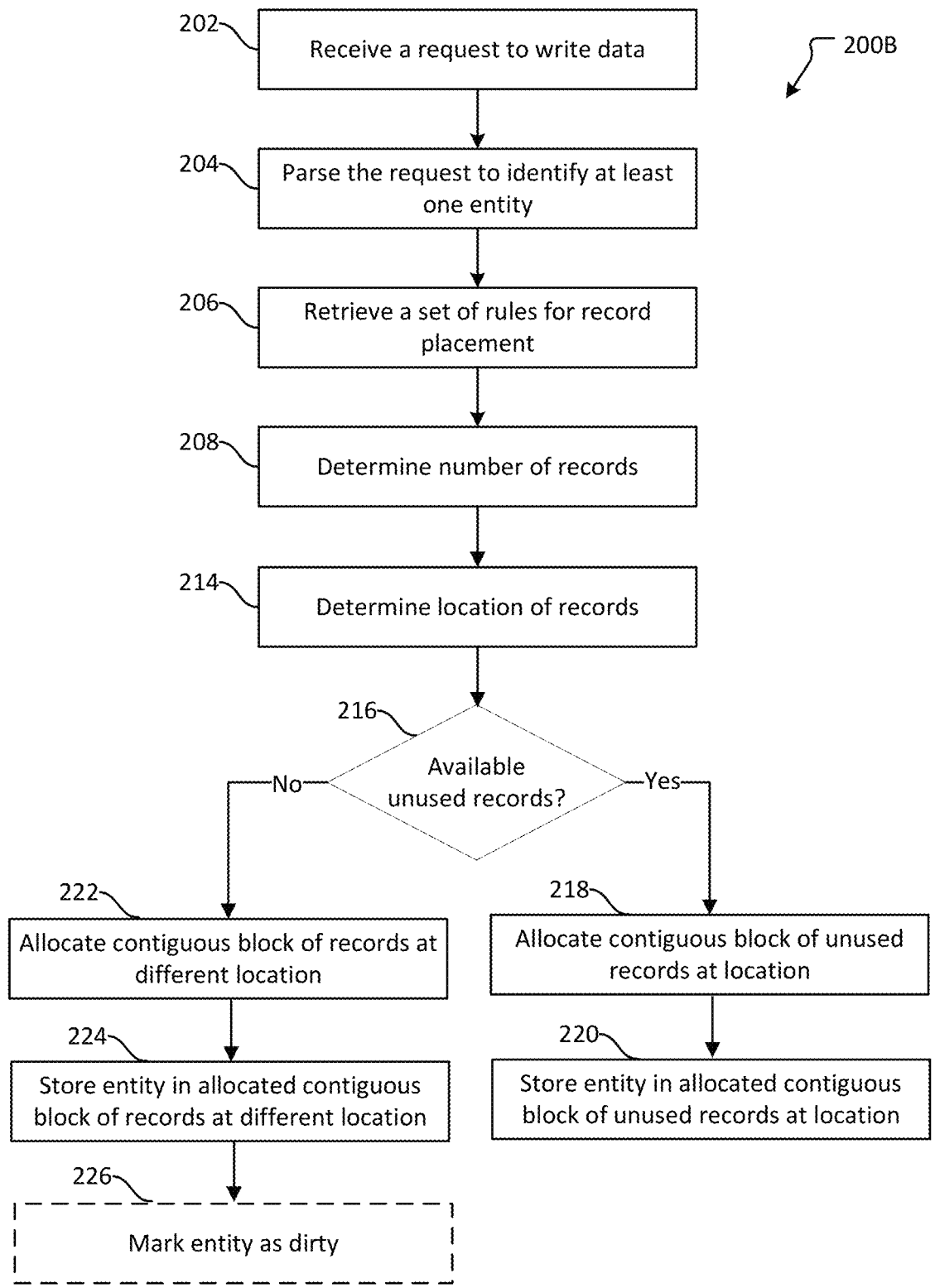

FIG. 2B illustrates a second method of placing records in a graph database. Method 200B may comprise or be associated with one or more of the record placement technologies described in FIG. 1A.

At receive request operation 202, a request to write data to a graph database may be received, as described with reference to FIG. 2A.

At parse operation 204, the write request may be parsed to extract entities and/or properties, as described with reference to FIG. 2A.

At retrieve rules operation 206, one or more rules of a dynamic ruleset for record placement may be retrieved, as described with reference to FIG. 2A.

At determine record number operation 208, based at least in part on the extracted entity and at least a first rule of the set of rules, a number of records may be determined, as described with reference to FIG. 2A.

At determine location operation 214, based at least in part on the extracted entity and at least a first rule of the set of rules, a location in memory for storing the extracted entity may be determined. For instance, as described above, it may be determined that processing the write request involves creating one or more new edges defining one or more relationships between data in the write request (e.g., one or more entities) and one or more existing nodes within the graph database. In aspects, the locations of records storing the related one or more existing nodes within memory may be determined. Statistically-derived rules enable the system to identify optimal locations for record placement. For instance, information may be gathered regarding whether it is most common to go from or to a certain node type when traversing a certain edge type. Consider a graph that contains three different types of edges, Ea, Eb and Ec, and two types of nodes, Nx, and Ny. Further, access patterns on the graph are such that the queries originating from Nx most often follow edges of type Ec, less frequently edges of type Eb, and only rarely traverse edges of type Ea, which would be reflected in the order records are placed relative to each other in the record file (Ec before Eb before Ea). Queries originating from Ny nodes might have other characteristics, e.g., Ea may be the most frequently used edge type, which would result in edge records being placed accordingly when collocated with nodes of type Ny.

At determination operation 216, it may be determined whether unused records are available within nearby memory (or in close proximity) relative to the determined locations. As used herein, "unused" records may refer to open or empty records with memory. Additionally, it may be determined whether the number of available unused records is greater or equal to the number of records determined for storing the extracted entity. If so, the method may pass to allocation operation 218; if not, the method may pass to allocation operation 222.

If a sufficient number of unused records is available at the determined location, at allocate operation 218, a block of unused records in proximity to the location (e.g., adjacent or near adjacent) may be allocated and reserved. As used herein, a "block of unused records" is a linear set of more than one contiguous unused record. That is, if writing the extracted entity with related properties will consume N unused records, the execution engine may be granted a single chunk of N contiguous unused records, rather than N single records which might or might not be contiguous depending on the current query load. In this way, based on the statistics described above, fragmentation may be minimized and the performance of the graph database may be optimized.

At store operation 220, the extracted entity (and any related properties) may be written to the allocated contiguous block of unused records. The write operation may be performed concurrently with one or more other write requests, while ensuring atomicity, consistency, isolation and durability of the processing, e.g., by using transaction methods such as two-phase lock protocols.

If a sufficient number of unused records is not available at the determined location, at allocate operation 222, a block of records may be allocated and reserved at a different location. In some aspects, the different location may not be adjacent and/or closely proximate to the determined location. In further aspects, the different location may be in a distant memory location from the determined location.

At store operation 224, the extracted entity (and any related properties) may be written to the allocated contiguous block of records at the different location. When records storing the extracted entity are not adjacent to related nodes and/or edges, data within the graph database may become fragmented causing a reduction in performance when traversing the graph.

At optional mark dirty operation 226, the entity may be marked as dirty. For example, whenever data is written to an existing entity or edge, for example altering an existing property or adding new properties, a check is made to verify whether or not the new data is placed together with/adjacent to other data belonging to the existing entity/edge. If not, the entity/edge is marked as being dirty and put on a "defragmentation queue." Defragmentation of such dirty entities/edges may occur by consuming this queue, where a dirty item is retrieved and defragmented. Additionally or alternative, whenever an edge is added to a previously created node, and the edge should be collocated with that node but is not, the node can be marked as dirty and be scheduled for defragmentation as discussed above for new data/properties on existing nodes/edges. The dirty node may be placed in the same or a separate queue for defragmentation and, in some cases, a different policy than that used for defragmenting nodes/edges with properties/data may be in order.

As should be appreciated, operations 202-226 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 3A:
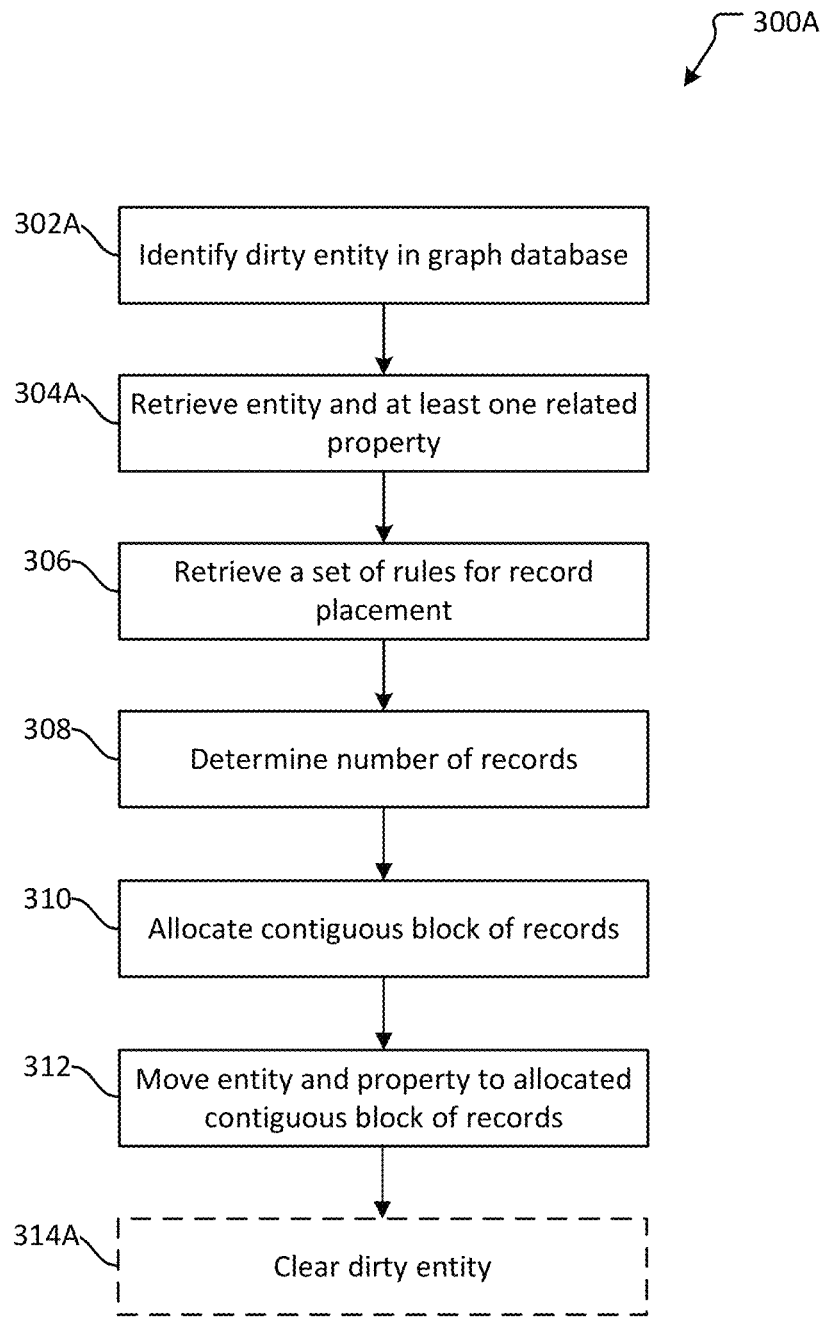
FIGS. 3A-3B illustrate first and second methods of defragmenting data in a graph database.

FIG. 3A illustrates a first method 300A for defragmenting data in a graph database. Method 300A may comprise or be associated with one or more of the record placement technologies described in FIG. 1B.

At identify operation 302A, a dirty entity may be identified within a graph database. In some aspects, dirty nodes or edges may be identified and added to a queue during runtime. For instance, whenever data is written to an existing entity or edge, e.g., altering an existing property or adding new properties, a check may be made to verify whether or not the new data is placed adjacent to other data belonging to the existing entity and/or edge. If not, the entity and/or edge is marked as being dirty and put on a "defragmentation queue." Additionally or alternative, whenever an edge is added to a previously created node, and the edge cannot be collocated with that node for some reason (e.g., insufficient unused records near records storing the node), the node may be marked as dirty and be scheduled for defragmentation as discussed above for new data/properties on existing nodes/edges. The dirty node may be placed in the same or a separate queue for defragmentation and, in some cases, a different policy than that used for defragmenting nodes/edges with properties/data may be in order.

At retrieve operation 304A, the dirty entity (and any related properties or other entities) may be retrieved, e.g., via a graph query. In some aspects, the graph database may be traversed (e.g., read) to locate one or more edges or nodes that are related to the dirty entity.

At retrieve rules operation 306, one or more rules of a dynamic ruleset for record placement may be retrieved. In aspects, the rules for defragmenting a graph database may be the same as the rules for optimal record placement (writing) within the graph database. In other aspects, one or more rules may be different for defragmenting than for writing records to the graph database. As discussed above, the dynamic ruleset may be derived based on one or more of access patterns associated with the graph database, polices, system characteristics, other heuristics, or combinations thereof. For instance, the access patterns may statistically characterize the traversal of edges from one node to another within the graph database for a plurality of queries. Statistically characterizing the traversal of edges may include evaluations such as identifying one or more edge types corresponding to the edges traversed, identifying one or more node types traversed from, and identifying one or more node types traversed to. Moreover, statistically characterizing the traversal of edges may include logging a number of each of the one or more node types traversed from and logging a number of each of the one or more node types traversed to. The dynamic ruleset for record placement may include one or more of: (1) arranging records corresponding to a property contiguously; (2) placing property data that is more frequently used within a context of the at least one entity in closer proximity to the at least one entity than to at least one other entity; (3) allocating contiguous records for storing edges with corresponding property records of a node; (4) sorting records storing edges by edge type; (5) placing an edge record adjacent to a node that is most likely to be the node traversed from; and the like.

At determine record number operation 308, similar to determine record number operation 208, based at least in part on the dirty entity, at least one related property, and at least one rule of the set of rules, a memory requirement for storing the entity and the at least one related property may be determined. For example, based on the dynamic ruleset described above, the memory requirements for particular types of nodes and edges corresponding to the entity and the at least one related property may be identified. The memory requirement may be determined (or estimated) as a number of bytes of memory. After determining a memory requirement for the entity and the at least one related property, a number of records may be determined. As noted above, record-based memory systems rely on fixed-sized records. In this case, the determined memory requirement may be divided by the fixed size of a record to determine the number of records needed. For example, for a determined memory requirement of 32 bytes, and a fixed-record size of 24 bytes, it may be determined that 1.33 records are needed. As partial records cannot be assigned, the system may determine that at least two records are needed for storing the dirty entity and the at least one related property.

At allocate record block operation 310, similar to allocate record block operation 210, at least one block of records may be allocated and reserved within the graph database. For instance, allocate record block operation 310 may use the number of records needed for storing the dirty entity and the at least one related property to allocate records. As used herein, a "block of records" is a linear set of more than one contiguous record. That is, if writing the dirty entity with related properties will consume N records, the execution engine may be granted a single chunk of N contiguous records, rather than N single records which might or might not be contiguous depending on the current query load.

At move operation 312, the dirty entity and the at least one related property may be relocated to the allocated contiguous block of records. That is, at least some memory (e.g., one or more records) may be vacated by moving the at least one entity and the at least one related property to the allocated contiguous block of records. In this way, the graph database may be defragmented and query performance may be optimized by placing the entity and the at least one related property in close proximity for traversal of the graph during an applicable query.

At optional clear operation 314A, the entity may no longer be identified as dirty. Rather, as the entity is now collocated with the at least one related property, traversal of the graph database may be optimized with respect to queries toward the entity. For example, the dirty entity may be cleared upon draining a defragmentation queue. Upon clearing the dirty entity, a measure of fragmentation may drop below a threshold level.

Figure 3B:
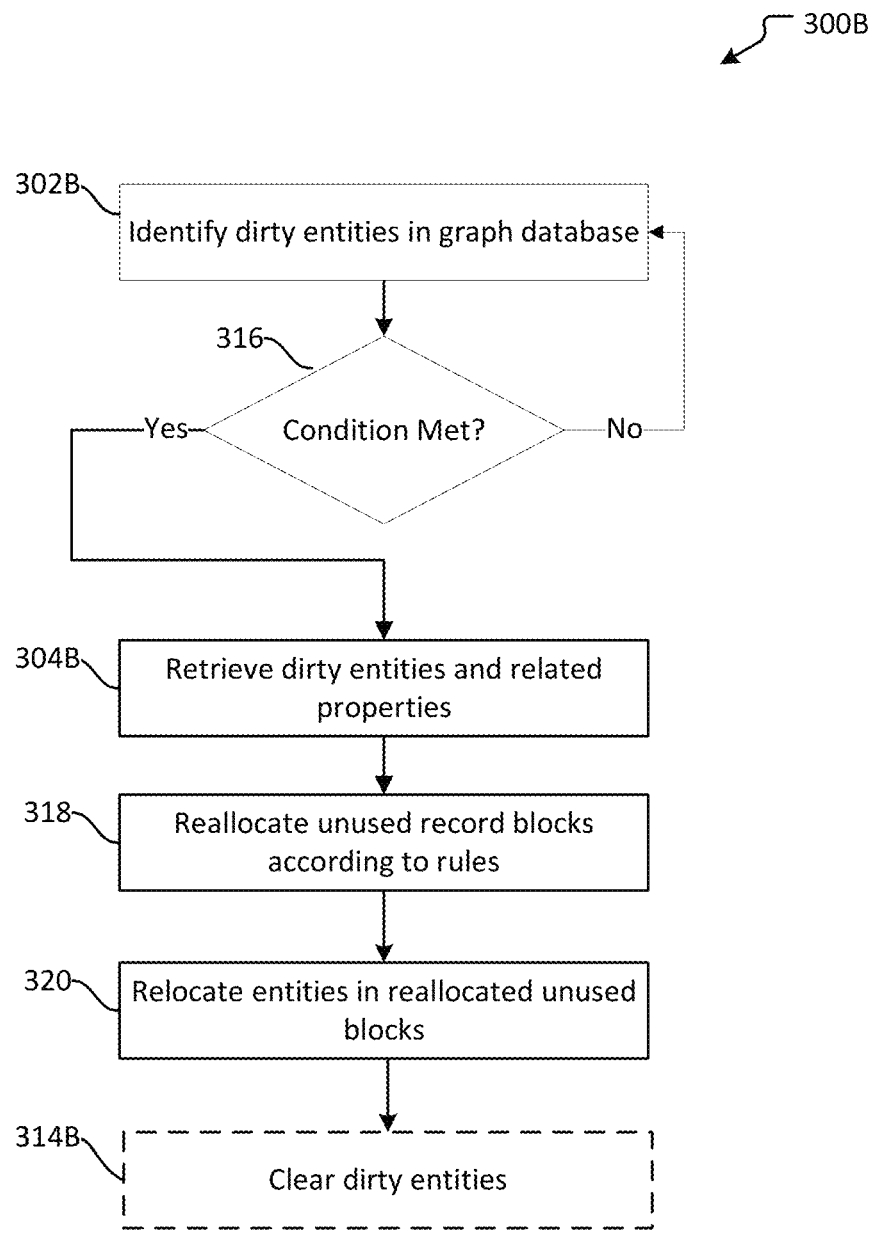

FIG. 3B illustrates a second method 300B for defragmenting data in a graph database. Method 300B may comprise or be associated with one or more of the record placement technologies described in FIG. 1B.

At identify operation 302B, a plurality of dirty entities may be identified within a graph database. In some aspects, as described above, dirty nodes or edges may be identified and added to a defragmentation queue during runtime. In some cases, a number of dirty flags ON in the graph database may be counted. For example, dirty flags may be counted within a defragmentation queue. In some aspects, the counted number of dirty flags may be compared to a threshold.

At determination operation 316, it may be determined whether one or more conditions have been met. In some aspects, defragmentation may be triggered when a number of dirty flags within the graph database meets a certain condition or conditions. In other aspects, a defragmentation queue may be drained based on desired runtime characteristics. Some examples of conditions include but are not limited to: (1) setting a threshold on defragmentation queue length; (2) attempting defragmentation following deletions of data from one or more records (e.g., when new memory is made available); (3) periodically defragmenting (e.g., based on a schedule); (4) setting a threshold not to exceed some measure of fragmentation within the graph database; (5) based on system characteristics (e.g., when new records are added to the record pool or file); and the like.

At retrieve operation 304B, the one or more dirty entities and any related properties may be retrieved, e.g., via a graph query. In some aspects, the graph database may be traversed (e.g., read) to locate one or more edges or nodes that are related to the one or more dirty entities.

At reallocate operation 318, a contiguous block of unused records may be reallocated for storing the one or more entities and the related properties. The reallocation may be determined based on one or more rules of the dynamic ruleset for record placement. For example, based on the dynamic ruleset described above, the number of records required for storing particular types of nodes corresponding each of the one or more entities and related properties may be identified. Further, based on statistics regarding normal query patterns, optimal positioning for certain types of edges that are often traversed with respect to the particular types of nodes may be accounted for. In this way, a contiguous block of records sufficient for storing the entities and the related properties may be allocated and reserved. As detailed above, defragmenting entities in a graph database amounts to retrieving entities and their properties, e.g., via a graph query, and moving the data to a new set of records that allows a better layout of the data. For instance, when defragmenting a node, any edges connected to the node may also be retrieved and collocated with the node.

At relocate operation 320, the one or more entities and related properties may be relocated to the reallocated block of unused records. In some aspects, relocating existing nodes and edges may involve more than one step, e.g., based on available memory for swapping and desired runtime characteristics. Additionally or alternatively, data that is not fragmented may be relocated during relocate operation 320, in order to defragment fragmented records. For instance, an entity that is not fragmented may be relocated to the reallocated block of unused records with fragmented entities in order to defragment the fragmented entities.

At optional clear operation 314B, the one or more entities may no longer be identified as dirty. Rather, as the entities are now collocated with related properties, traversal of the graph database may be optimized with respect to queries toward the entities. For example, the dirty entities may be cleared upon draining a defragmentation queue. Upon clearing the dirty entity, a measure of fragmentation may drop below a threshold level.

As should be appreciated, operations 302A-320 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 5B:
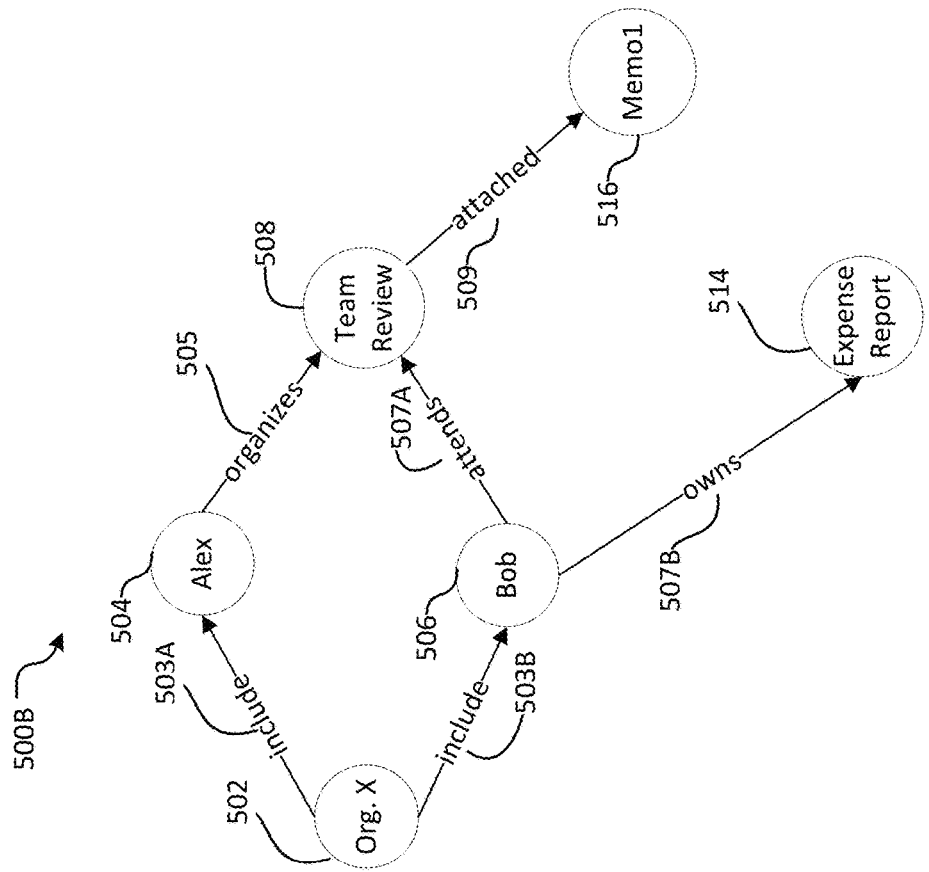
FIGS. 5A-5B illustrate structures of graphs according to an example graph database with which the disclosure may be practiced.
Figure 5A:
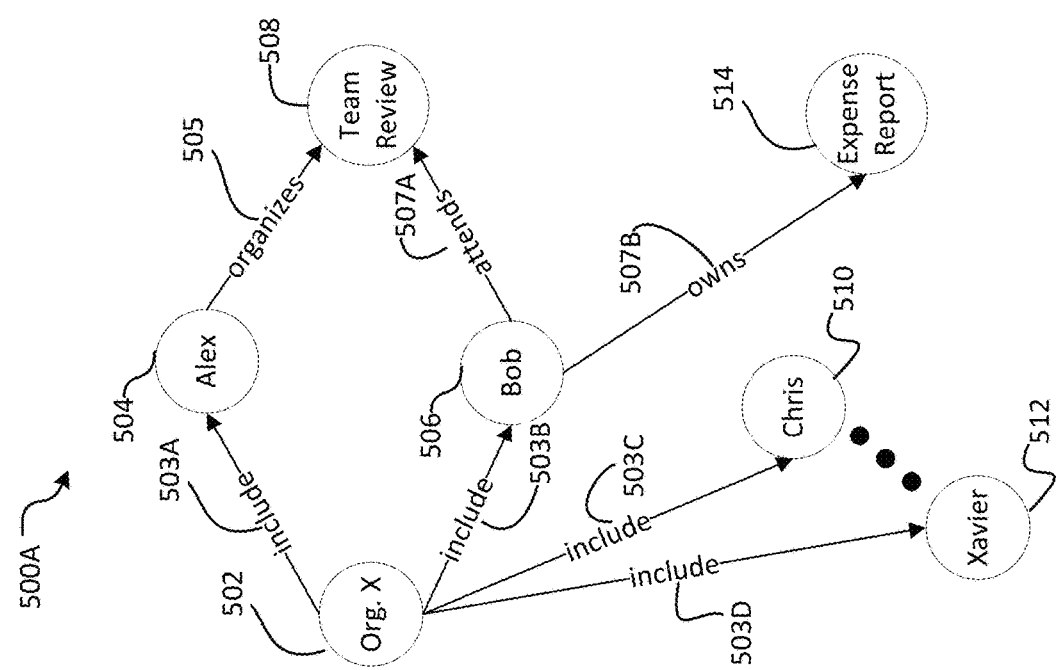
Figure 7:
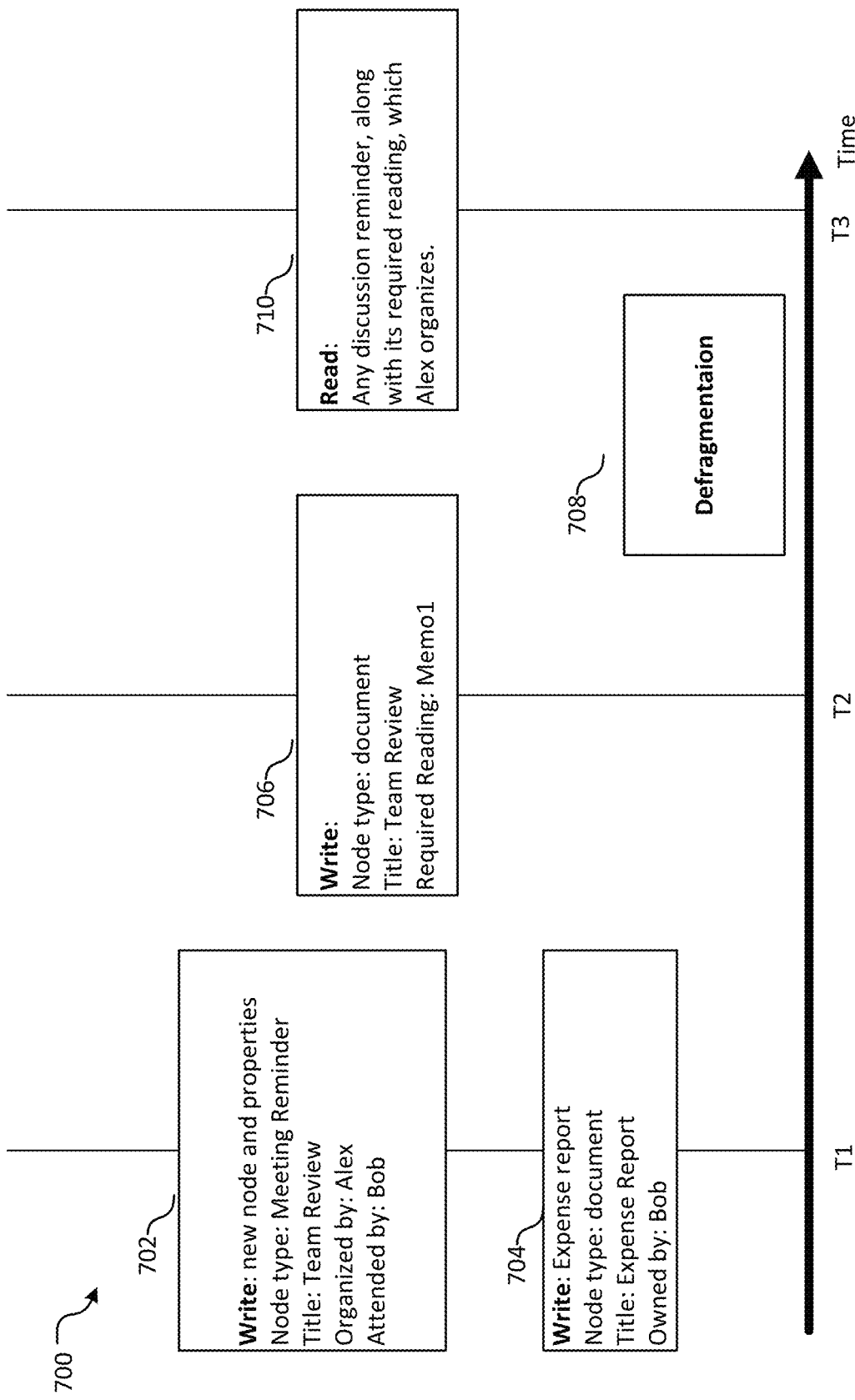
FIG. 7 illustrates examples of requests issued to a graph database with which the disclosure may be practiced.

Examples of systems and methods for optimally placing records in a graph database may be described with reference to FIGS. 4A-4B, FIGS. 5A-5B, FIGS. 6A-6C, and FIG. 7. In aspects, FIG. 4A and FIG. 4B may correspond to respective graph structures of FIG. 5A and FIG. 5B. The sequence of events triggered based on selecting the Save button 412 in the screen in FIG. 4A and/or FIG. 4B may correspond to a write request 702 and a write request 706, respectively, in FIG. 7. In particular, FIGS. 4A and 4B illustrate examples of a graphical user interface for creating and revising a meeting reminder. FIGS. 5A-5B illustrate graph structures according to an example graph database with which the disclosure may be practiced. FIGS. 6A-6C illustrate examples of record block layouts according to examples. FIG. 7 illustrates examples of requests issued along a time line to a graph database with which the disclosure may be practiced.

FIGS. 4A and 4B illustrate examples of a graphical user interface (GUI) for creating and revising a meeting reminder.

FIG. 4A illustrates an example GUI 400A for creating a meeting reminder 402. Title 404 of the meeting may be "Team Review." Shared reading is not specified and (TBD) (to be decided) is displayed. Alex is the organizer 406 of the meeting and Bob is a participant 408 of the meeting. After entering subject "Team Review," the Save button 412 may be selected to save the meeting reminder.

The following example describes an example of optimally allocating records in a graph database when two write requests are received concurrently. As shown in FIG. 4A, a user Alex may create a meeting reminder with Title "Team Review," thereby designating Alex as organizer 406 of the meeting reminder. Bob has been designated as a participant 408 (e.g., "joined by") and shared reading has not been designated. Upon selecting the Save button 412, Alex may create the meeting reminder, which may trigger a write request to a graph database within an enterprise domain for an organization to which Alex belongs, or other domain. For example, such write request may correspond to write request 702 in FIG. 7. The write request 702, received at time T1 as shown in FIG. 7, may request that data associated with creating the meeting reminder be written to a graph database.

In aspects, the write request may be parsed to identify at least one entity and one or more properties. For example, an identified entity for meeting reminder 402 may be "meeting reminder" and an identified property may be a "title" of "Team Review." As illustrated, the meeting reminder does not include additional properties, such as a date and time, a location, etc. In this case, a node type corresponding to the meeting reminder may be a "meeting node," which may be related as "titled" with a property, "Team Review," related as "organized" with a first person node, Alex, and related as "attendee" with a second person node, Bob.

As will be described further below, at the same time T1, another write request 704 may be received (e.g., concurrently received). The write request 704 may be a request to write a new node on an expense report that is owned by Bob.

FIG. 4B illustrates an example GUI 400B for updating the meeting reminder 402. As shown in FIG. 4B, Alex may update the meeting reminder 402 by attaching a document 416 entitled "Memo1" to a shared reading list 414. Alex may then select Save button 412. Upon selecting Save button 412, as illustrated by FIG. 7, a write request 706 may be received at time T2 by a write execution engine of the graph database.

As should be appreciated, the various methods, devices, components, etc., described with respect to FIGS. 4A and 4B are not intended to limit GUIs 400A and 400B. Accordingly, additional topology configurations may be used to practice the methods and systems herein and/or components described may be excluded without departing from the methods and systems disclosed herein.

FIGS. 5A-5B illustrate graph structures according to an example graph database with which the disclosure may be practiced.

As shown in FIG. 5A, a write request 702 may result in adding a meeting node 508 entitled "Team Review" to a graph 500A. In this case, meeting node 508 ("Team Review") may be associated with property data (e.g., the title, "Team Review"). In other examples (not illustrated), meeting node 508 ("Team Review") may be related by an edge "titled" to a property node "Team Review." As illustrated, meeting node 508 ("Team Review") is connected by edge 505 ("organizes") to a first person node 504 ("Alex") and is connected by edge 507A ("attends") to a second person node 506 ("Bob"). In some aspects, when meeting node 508 was created, the first person node 504 ("Alex") and the second person node 506 ("Bob") may have already existed in the graph database as members of an Organization X. An organization node 502 ("Org. X") is illustrated with four edges: a first edge 503A ("include") connected to the first person node 504 ("Alex"), a second edge 503B ("include") connected to the second person node 506 ("Bob"), an third edge 503C ("include") connected to a third person node 510 ("Chris"), and a fourth edge ("include") connected to a fourth person node 512 ("Xavier"). Thus, Organization X includes members Alex, Bob, Chris and Xavier; however, only Alex and Bob relate to the meeting node 508 ("Team Review") among the members of the Organization X.

Concurrent to a time that the write request 702 was generated, at time T1, Bob may decide to save an expense report to the graph database, resulting in generating a write request 704. As illustrated by FIG. 5B, a graph 500B illustrates the addition of a first document node 514 ("Expense Report") connected by edge 507B ("owns") to the second person node 506 ("Bob"). In the example, the first document node 514 ("Expense Report") is independent from the meeting node 508 ("Team Review") attended by Bob.

Additionally, at time T2, as detailed above with respect to FIGS. 4B and 7, write request 706 may be generated when Alex updates the shared reading list 414 of meeting reminder 402 with a document 416 entitled "Memo1." In this case, as illustrated by FIG. 5B, a second document node 516 ("Memo") may be connected by edge 509 ("attached") to meeting node 508 ("Team Review").

As should be appreciated, the various methods, devices, components, etc., described with respect to FIGS. 5A and 5B are not intended to limit example graphs 500A and 500B. Accordingly, additional topology configurations may be used to practice the methods and systems herein and/or components described may be excluded without departing from the methods and systems disclosed herein.

FIG. 6A illustrates a first example of a record block 600A layout, according to aspects of the disclosure. For example, FIG. 6A illustrates placement of records in a linear memory space for storing a graph database that is based on the concept of index-free adjacency. As illustrated, each record in the linear memory space is of the same size (e.g., same number of bytes of memory). In aspects, records 610A-638A may be contiguous records within the linear memory space.

In particular, the record block 600A corresponds to an example of the record block 600A after receiving (at time T1) and writing the write request 702 (e.g., for creating meeting reminder 402) and write request 704 (e.g., for storing a document, "Expense Report," to the graph database). As illustrated, record block 600A includes records 610A through record 638A. Records 610A through 618A comprise existing data in the graph database, i.e., the organization node 502 ("Org. X"), the first person node 504 ("Alex"), the second person node 506 ("Bob"), along with associated edges 503A, 503B ("include"). Additional members of Organization X and associated edges are not shown in FIGS. 6A-6C for the purpose of simplicity in illustrating the example.

As shown in record block 600A, after processing the write request 702 and the write request 704, records that were newly allocated are shown in bold. For example, with respect to write request 702, an edge 507A ("attends") may be placed at record 620A based on a rule of record placement, which may provide that an edge associated with a node should be placed in a record near or adjacent to the node. In the example, the edge 507A ("attends") in record 620A is associated with second person node 506 ("Bob") in record 618A. Similarly edge 505 ("organizes") in record 622A is associated with first person node 504 ("Alex") in record 616A. Edge 507B "owns" in record 624A is related to second person node 506 ("Bob") in record 618A. In this case, edge 507B may be followed by an unused record at record 626A. For example, a rule may provide that an edge that originates from a node should be placed in a record close to a node. However, as illustrated, node 508 ("Team Review") and node 514 ("Expense Report") are placed some distance from associated nodes and/or edges. In some cases, some write requests (e.g., for certain types of entities, such as a meeting or a document, may allocate additional records so as to allow for additional data and properties to be added later, e.g., based on one or more rules of the dynamic ruleset.

As discussed above with respect to FIGS. 4B and 7, at time T2, Alex may attach a document 416 ("Memo1") to a shared reading list 414, thereby updating the meeting reminder 402 ("Team Review"). As shown in FIG. 4B, Alex may select document 416 ("Memo1") and select the Save button 412. Upon selecting Save button 412, a write request 706 may be generated. As shown in FIG. 5B, a new node 516 ("Memo1") may be added to the graph database, along with a new edge 509 ("attached"), which is associated with the existing node 508 ("Team Review").

Upon processing write request 706, record block 600B of FIG. B illustrates record placement in the graph database. As shown in bold, the edge 509 ("attached") may be added to record 630B, which was previously unused. Similarly, the new node 516 ("Memo1") may be added to record 632B. However, when records are either written or traversed, violations of one or more rules of a dynamic ruleset for record placement may be detected. For example, as illustrated, three records are associated with dirty flags. As discussed above, these records may be marked as dirty by virtue of comprising dirty entities (or the records may additionally be marked as dirty to serve as a metric of fragmentation). Edge 505 ("organizes") may be identified as dirty because edge 505, which originates from the first person node 504 ("Alex"), is not placed adjacent (or near) node 504. Similarly, the edge 507B ("owns") may be identified as dirty because, although edge 507B originates from second person node 506 ("Bob"), edge 507B is not placed adjacent (or near) second person node 506 within the record block 600B. That is, edge 507B is interleaved with edge 505 originating from first person node 504. Additionally, node 514 ("Expense Report") in record 638A may be identified as dirty because, although node 514 originates from second person node 506 ("Bob"), node 514 is not adjacent (or near) record 618A storing node 506.

In the illustrated non-limiting example, defragmentation may be triggered when a number of records (or entities) marked with dirty flags reaches three. In another example, defragmentation may be scheduled at a predefined time interval. In still other examples, defragmentation may be triggered based on satisfaction of one or more conditions. As shown in FIG. 7, defragmentation 708 may be executed after time T2.

As shown in FIG. 6C, after defragmentation 708, one or more records of record block 600C have been reallocated and relocated based on one or more rules of a dynamic ruleset for record placement. For example, after defragmentation, the edge 505 ("organizes") may be relocated to record 618A adjacent to the first person node 504 ("Alex"). Although the second person node 506 ("Bob") was not identified as dirty, node 504 may be relocated to record 620C such that edge 507A ("attends") (relocated to record 622C) and edge 507B ("owns") (not relocated) may either be adjacent (or near) the second person node 506 ("Bob"). Additionally, document node 514 ("Expense Report") may be relocated near edge 507B "owns" and second person node 506 ("Bob"). Meeting node 508 ("Team Review"), which was not marked as dirty, may be relocated to record 630C adjacent (or near) edge 509 ("attached") and the document node 516 ("Memo1"). The example is for the purpose of describing the method for optimized record placement in a graph database. There may be a number of other examples of relocating data to contiguous records in order to optimize a graph database. Additionally, in at least some cases, entity data may be placed in a temporary memory location prior to emptying target records and relocating the entity data.

As should be appreciated, the various methods, devices, components, etc., described with respect to FIGS. 6A-6C are not intended to limit example record blocks 600A-600C. Accordingly, additional topology configurations may be used to practice the methods and systems herein and/or components described may be excluded without departing from the methods and systems disclosed herein.

FIG. 7 illustrates example 700 of requests issued along a time line to a graph database with which the disclosure may be practiced.

As described above, at time T1, write request 702 (e.g., for creating meeting reminder 402) and write request 704 (e.g., for storing a document, "Expense Report," to the graph database) are received. At time T2, as described above, a document 416 ("Memo1") may be attached to meeting reminder 402 ("Team Review"), generating a write request 706. Further, defragmentation 708 may be triggered sometime after T2.

At time T3, a read request 710 (e.g., a query) may be generated toward the graph database. For example, read request 710 may be a request to view document 416 ("Memo1") attached to meeting reminder 402 ("Team Review"). Receiving the read request may result in traversing the graph database to retrieve and read the requested information. For example, the graph 500B may be traversed from node 502 ("Org. X") via edge 503A ("include") to first person node 504 ("Alex"), from node 504 via edge 505 ("organizes") to meeting node 508 ("Team Review"), and from node 508 via edge 509 ("attached") to the document node 516 ("Memo1") to display the Memo identified in the shared reading list.

As should be appreciated, the various methods, devices, components, etc., described with respect to FIG. 7 are not intended to limit example 700. Accordingly, additional topology configurations may be used to practice the methods and systems herein and/or components described may be excluded without departing from the methods and systems disclosed herein.

In some aspects, the size of the entire memory space to place records may be much larger than the space as illustrated in FIGS. 6A-6C. In a large memory space, performance may be negatively impacted if nodes and edges are placed far apart, requiring separate read accesses to the different record locations. A number of records that read at one time may be small as compared to the entire memory space. For example, a size of CPU cache line may be 128 bytes, while the onboard memory may be 1 Gbyte. The larger memory space may also accommodate flexible record allocation rules because of potentially more unused records in the memory space.

In some aspects, the optimized record placement may help performance improve by optimally placing records in frequent use within the sizes of CPU cache line, onboard memory, and hard disks, hierarchically placed as separate memory spaces with different access speeds in a computing device. For example, respective sizes of CPU cache line, onboard memory, and hard disks may be included to define a dynamic ruleset for record placement, such that records with frequent use may be placed within the respective number of records in respective locations.

In some aspects, the optimized record placement application on a graph database may be implemented in a distributed systems environment with client devices such as smartphones and tablets and server computing devices. For examples, records may be optimally placed and defragmented is necessary such that records that may be accessed frequently are more likely to be placed in the client devices. For example, a size of local memory at a client device may be included to define a dynamic ruleset for record placement, such that records with frequent use may be placed within the size of local memory.

As an example of a processing device operating environment, refer to the exemplary operating environments depicted in FIGS. 8-11. In other instances, the components of systems disclosed herein may be distributed across and executable by multiple devices. For example, input may be entered on a client device and information may be processed or accessed from other devices in a network (e.g. server devices, network appliances, other client devices, etc.).

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, described herein.

Figure 8:
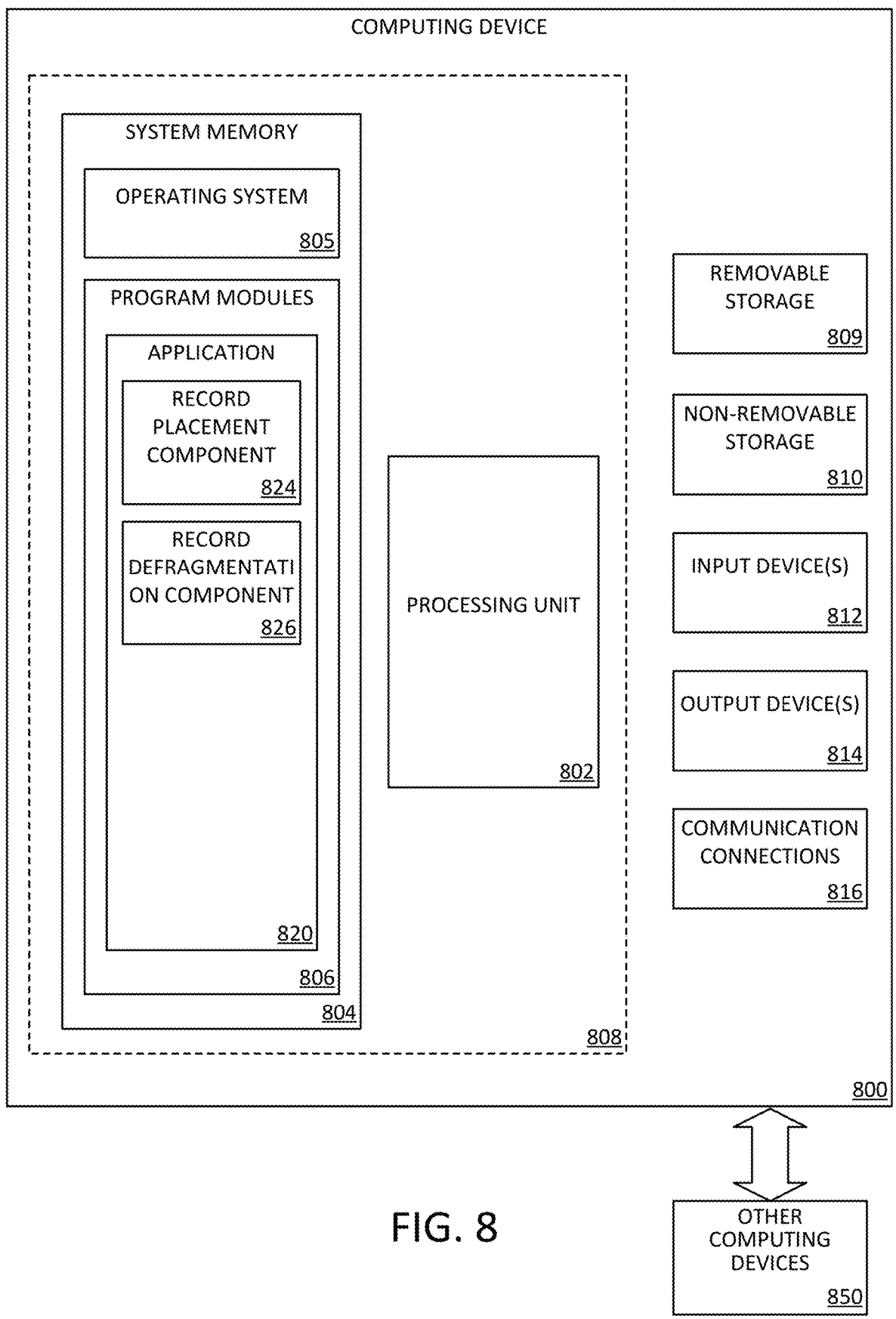
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may be suitable for the computing devices described above, including the client computing devices 102A-C and the server computing devices 106A-C. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for performing the various aspects disclosed herein such as a record placement component 824 and a record defragmentation component 826. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
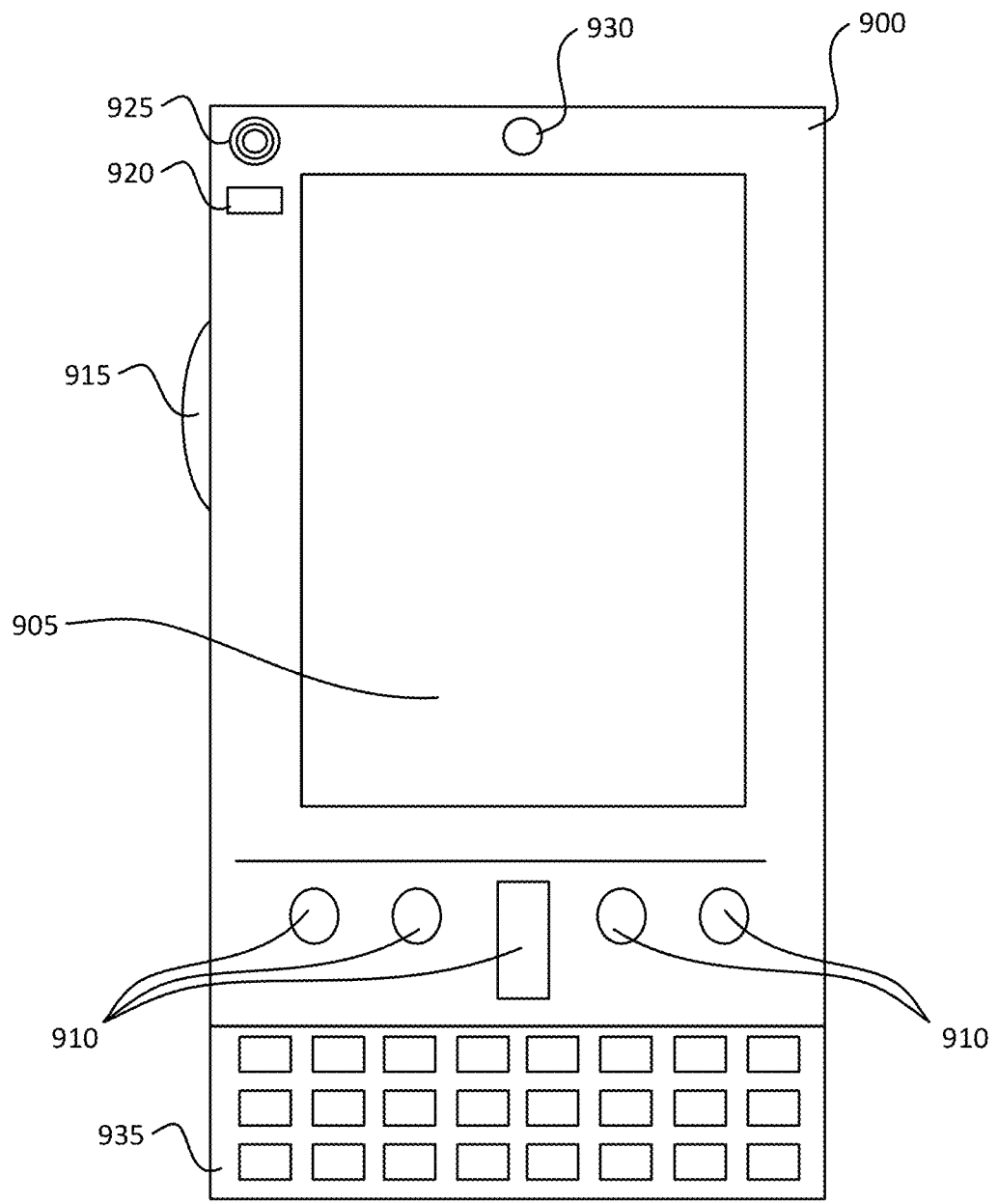
FIGS. 9A and 9B are simplified block diagrams of a mobile computing device with which aspects of the present disclosure may be practiced.
Figure 9B:
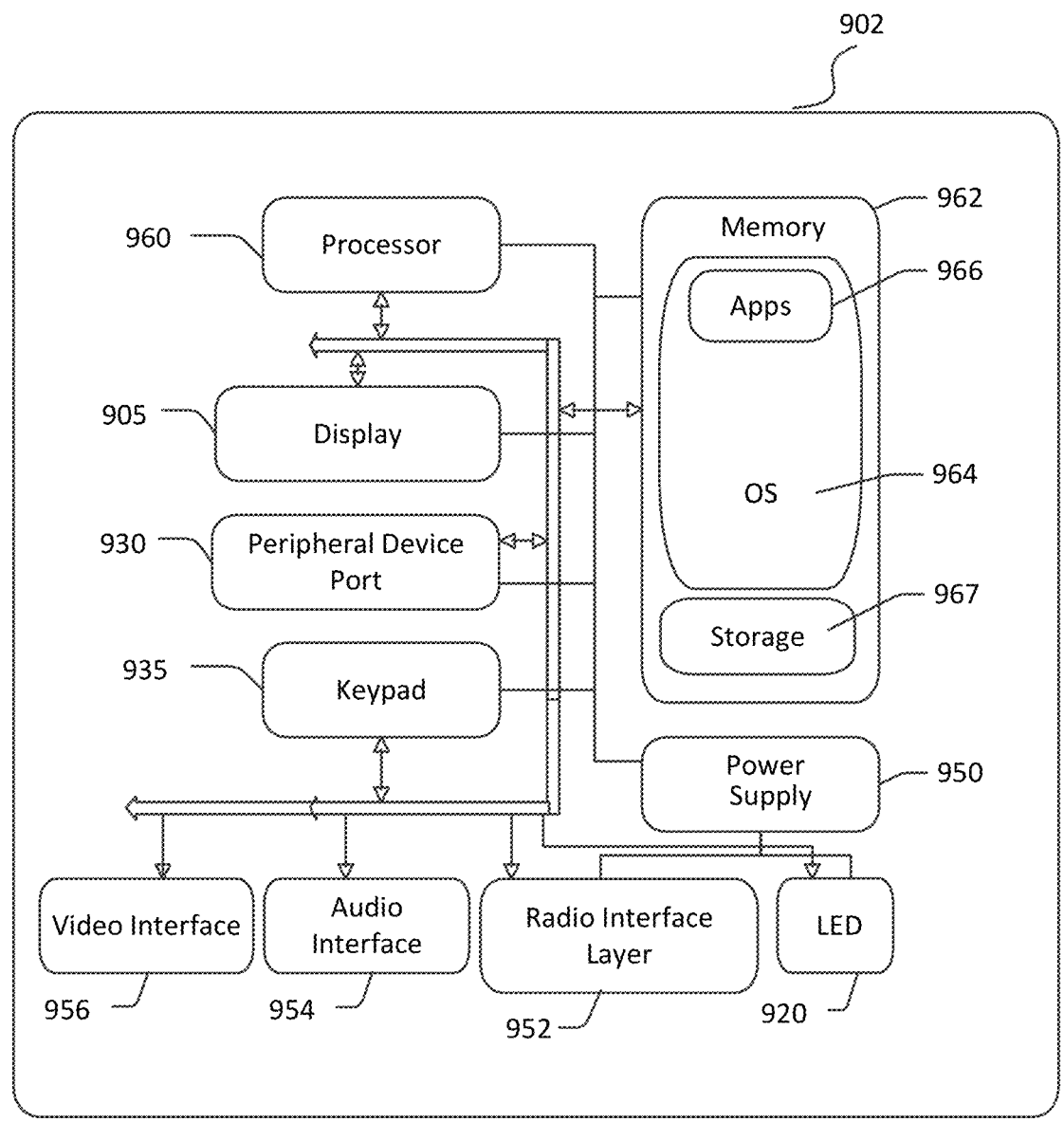

FIGS. 9A and 9B illustrate a mobile computing device 900, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g., search engine, extractor module, relevancy ranking module, answer scoring module, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated embodiment, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
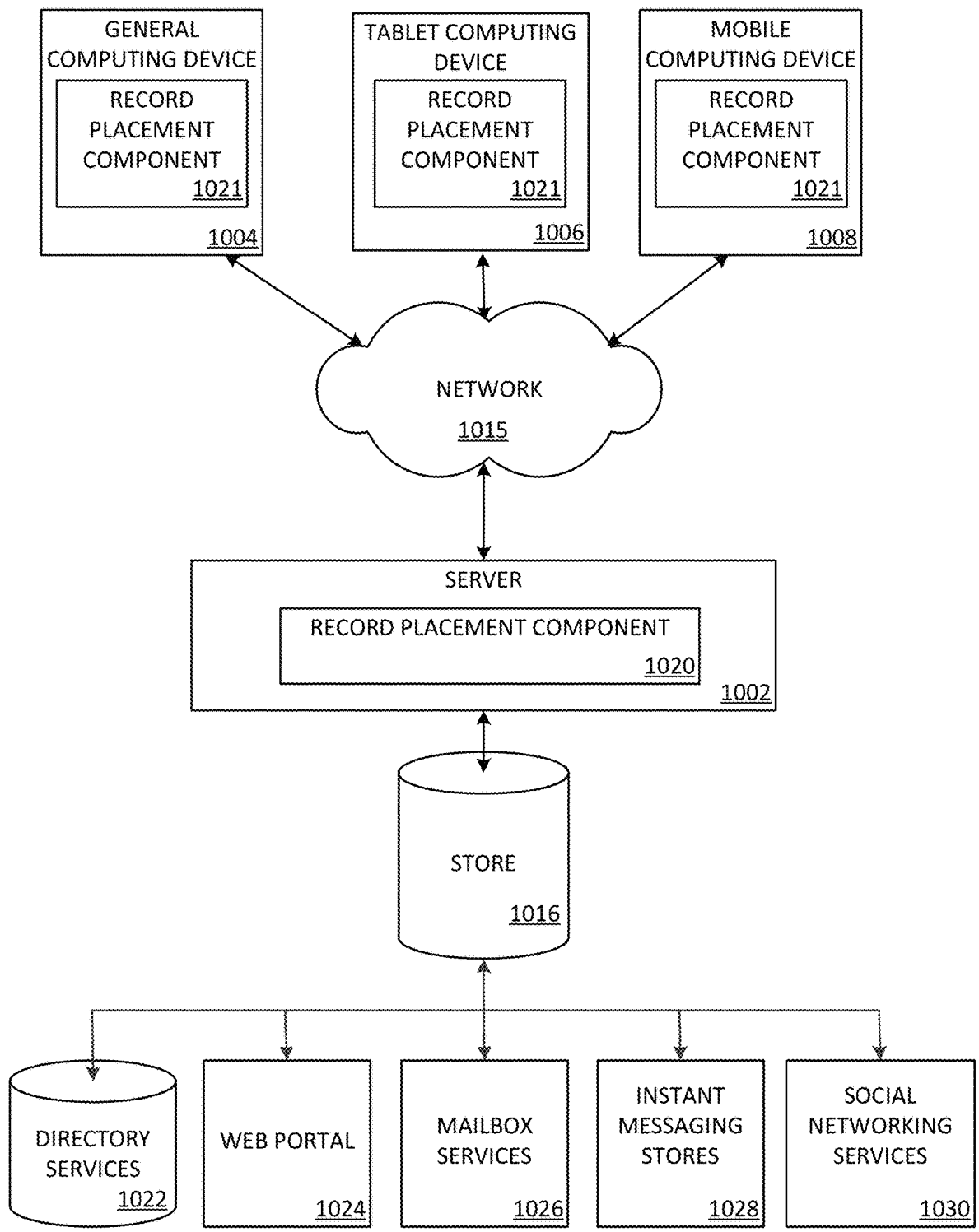
FIG. 10 is a simplified block diagram of a distributed computing system in which aspects of the present disclosure may be practiced.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. Client record placement component 1021 may be employed by a client that communicates with server device 1002, and/or record placement component 1020 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these embodiments of the computing devices may obtain content from the store 1016, in addition to receiving graphical data useable to be either pre-processed at a graphic-originating system, or post-processed at a receiving computing system.

Figure 11:
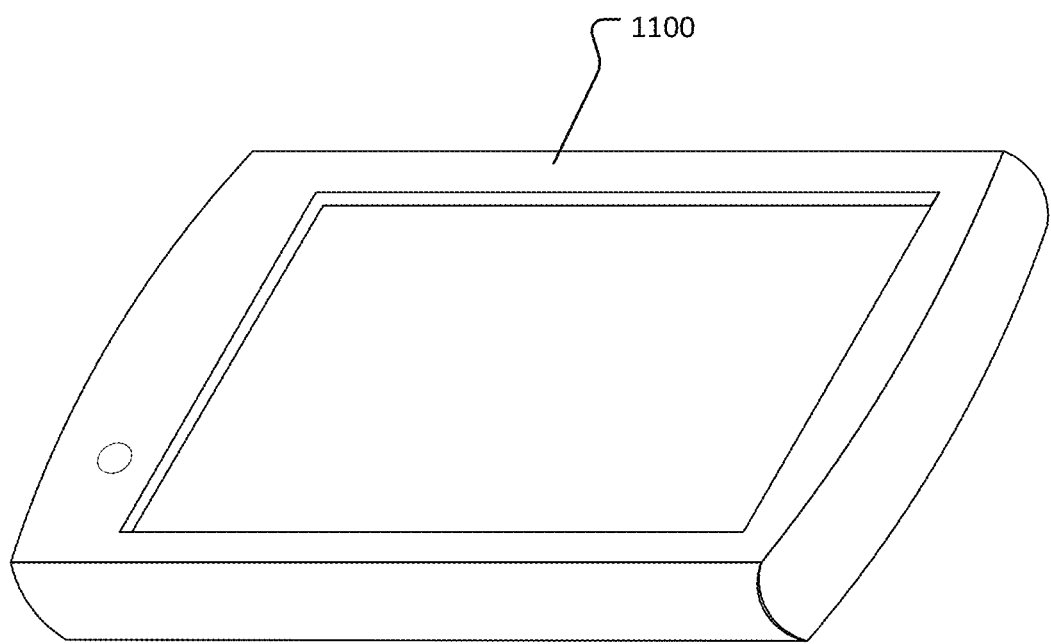
FIG. 11 illustrates a tablet computing device for executing one or more aspects of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method for storing data in a graph database, comprising:
   receiving a request to write data to the graph database, wherein the graph database comprises a plurality of nodes having different node types, a plurality of edges having different edge types, and a plurality of properties;
   parsing the request to identify at least one entity, wherein the at least one entity corresponds to a first node of a first node type, and wherein the at least one entity is related to at least a second node of a second node type or an edge of an edge type within the graph database;
   retrieving a dynamic ruleset for record placement within a memory space associated with the graph database, the dynamic ruleset being automatically updated based, at least in part, on a statistical analysis of traversals across the edge types with respect to the node types in the graph database in response to queries;
   based at least in part on the dynamic ruleset, determining (i) a number of memory records for storing the at least one entity as the first node in the graph database and (ii) a storage location in the memory space for the number of memory records, wherein the dynamic ruleset indicates that a memory record for the first node should be stored in the memory space near at least one of a memory record for the second node of the second node type or a memory record for the edge of the edge type based on a frequency the second node or the edge is accessed within a context of the first node;
   allocating the number of memory records to the storage location in a contiguous block of available memory records; and
   storing the at least one entity and data associated with one of the second node or the edge in the allocated contiguous block of available memory records.

2. The computer-implemented method of claim 1, wherein the dynamic ruleset is derived based on one or more of: statistical access patterns associated with the graph database, one or more policies, system configurations, system characteristics, or heuristics.

3. The computer-implemented method of claim 2, wherein the access patterns are evaluated during query execution.

4. The computer-implemented method of claim 2, wherein the access patterns statistically characterize the traversal of edges from one node to another within the graph database for a plurality of queries.

5. The computer-implemented method of claim 4, wherein statistically characterizing the traversal of edges comprises one or more of:
   identifying one or more edge types corresponding to the edges traversed;
   identifying one or more node types traversed from; or
   identifying one or more node types traversed to.

6. The computer-implemented method of claim 5, further comprising:
   logging a number of each of the one or more node types traversed from; and
   logging a number of each of the one or more node types traversed to.

7. The computer-implemented method of claim 1, wherein the dynamic ruleset for record placement comprise one or more of:
   arranging records corresponding to a property contiguously;
   placing property data that is more frequently used within a context of the at least one entity in closer proximity to the at least one entity than to at least one other entity;
   allocating contiguous available records for storing edges with corresponding property records of a node;
   sorting records storing edges by edge type; or
   placing an edge record adjacent to a node that is most likely to be the node traversed from.

8. The computer-implemented method of claim 1, wherein a first rule of the dynamic ruleset is used to determine the number of memory records for storing the at least one entity and a second rule of the dynamic ruleset is used to determine the storage location in the memory space for the number of memory records.

9. The computer-implemented method of claim 8, wherein the location is adjacent to a record storing at least one of the related node and the related edge.

10. The computer-implemented method of claim 8, wherein the second rule and the first rule are different.

11. The computer-implemented method of claim 8, wherein the second rule and the first rule are the same.

12. The computer-implemented method of claim 8, further comprising:
allocating the contiguous block of available records at the location in memory.

13. The computer-implemented method of claim 8, further comprising:
determining that the number of records is greater than a number of available records at the location in memory; and
marking the at least one entity as dirty.

14. A computing device, comprising:
at least one processing unit; and
at least one memory storing computer executable instructions for storing data to a graph database, the instructions when executed by the at least one processing unit causing the computing device to:
receive a request to write data to the graph database, wherein the graph database comprises a plurality of nodes having different node types and a plurality of edges;
parse the request to identify at least one entity, wherein the at least one entity corresponds to a first node of a first node type, and wherein the at least one entity is related to at least a second node of a second node type or an edge of an edge type within the graph database;
retrieve a dynamic ruleset for record placement within a memory space associated with the graph database, the dynamic ruleset being automatically updated based, at least in part, on a statistical analysis of traversals across the edge types with respect to the node types in the graph database in response to queries;
based at least in part on the dynamic ruleset, determine (i) a number of memory records for storing the at least one entity as the first node in the graph database and (ii) a storage location in the memory space for the number of memory records, wherein the dynamic ruleset indicates that a memory record for the first node should be stored in the memory space near at least one of a memory record for the second node of the second node type or a memory record for the edge of the edge type based on a frequency the second node or the edge is accessed within a context of the first node;
determine a location in memory for storing the at least one entity;
allocate the number of memory records to the storage location in a contiguous block of available memory records at the location in memory; and
store the at least one entity and data associated with one of the second node or the edge in the allocated contiguous block of available memory records.

15. The computing system of claim 14, wherein the location is in proximity to a record storing at least one of the node and the edge.

16. The computing system of claim 14, wherein the dynamic ruleset is derived based on one or more of: statistical access patterns associated with the graph database, one or more policies, system configurations, system characteristics or heuristics.

17. The computing system of claim 16, wherein the access patterns statistically characterize the traversal of edges from one node to another within the graph database for a plurality of queries.

18. The computing system of claim 14, the computer executable instructions further causing the computing device to:
determine that the number of records is greater than a number of available records at the location in memory;
allocate the contiguous block of available records at a different location in memory; and
mark the at least one entity as dirty.

19. A computer storage medium storing computer executable instructions for storing data in a graph database, the instructions when executed by at least one processing unit, cause the at least one processing unit to:
receive a request to write data to the graph database, wherein the graph database comprises a plurality of nodes having different node types and a plurality of edges;
parse the request to identify at least one entity, wherein the at least one entity corresponds to a first node of a first node type, and wherein the at least one entity is related to at least a second node of a second node type or an edge of an edge type within the graph database;
retrieve a dynamic ruleset for record placement within a memory space associated with the graph database, the dynamic ruleset being automatically updated based, at least in part, on a statistical analysis of traversals across the edge types with respect to the node types in the graph database in response to queries;
based at least in part on the dynamic ruleset, determine (i) a number of memory records for storing the at least one entity as the first node in the graph database and (ii) a storage location in the memory space for the number of memory records, wherein the dynamic ruleset indicates that a memory record for the first node should be stored in the memory space near at least one of a memory record for the second node of the second node type or a memory record for the edge of the edge type based on a frequency the second node is accessed within a context of the first node;
when the number of memory records does not exceed a number of available memory records of the memory space:
allocate the number of memory records to the storage location in a contiguous block of the available memory records; and
store the at least one entity and data associated with one of the second node or the edge in the allocated contiguous block of available memory records; and
when the number of memory records exceeds the number of available memory records of the memory space, marking the at least one entity as dirty.

20. The computer storage medium of claim 19, wherein a first rule of the dynamic ruleset is used to determine the number of memory records for storing the at least one entity and a second rule of the dynamic ruleset is used to determine the storage location in the memory space for the number of memory records.

* * * * *